(12) United States Patent
Piper

(10) Patent No.: US 11,497,288 B1
(45) Date of Patent: Nov. 15, 2022

(54) CASE FOR PORTABLE ELECTRONIC COMPUTING DEVICE

(71) Applicant: Pioneer Square Brands, Inc., Seattle, WA (US)

(72) Inventor: Brian Lewis Piper, Seattle, WA (US)

(73) Assignee: Pioneer Square Brands, Inc., McLean, VA (US)

( * ) Notice: Subject to any disclaimer, the term of this patent is extended or adjusted under 35 U.S.C. 154(b) by 0 days.

(21) Appl. No.: 17/831,239

(22) Filed: Jun. 2, 2022

(51) Int. Cl.
*A45C 11/00* (2006.01)

(52) U.S. Cl.
CPC .......... *A45C 11/00* (2013.01); *A45C 2011/003* (2013.01)

(58) Field of Classification Search
CPC ............... A45C 11/00; A45C 2011/003; A45F 2200/0516; A45F 2200/0525
See application file for complete search history.

(56) References Cited

U.S. PATENT DOCUMENTS

| | | | |
|---|---|---|---|
| 9,756,915 B2 | 9/2017 | Nguyen et al. | |
| 9,795,044 B2 * | 10/2017 | Lai ..................... | H05K 5/0086 |
| 10,003,371 B1 | 6/2018 | Given et al. | |
| 10,050,374 B1 * | 8/2018 | Lee ..................... | G06F 1/1656 |
| 10,194,725 B2 * | 2/2019 | Lai ..................... | A45C 11/00 |
| 10,827,809 B2 * | 11/2020 | Skahan .................. | A45F 5/102 |
| 11,068,023 B1 * | 7/2021 | Manzano ............... | G03B 11/04 |
| 11,083,100 B2 | 8/2021 | Shindo et al. | |
| 2009/0181729 A1 | 7/2009 | Griffin, Jr. et al. | |
| 2013/0271902 A1 * | 10/2013 | Lai ..................... | H05K 5/0086 361/679.01 |
| 2014/0119718 A1 | 5/2014 | Oh et al. | |
| 2014/0198439 A1 | 7/2014 | De Pietro et al. | |
| 2014/0262847 A1 | 9/2014 | Yang | |
| 2015/0189963 A1 * | 7/2015 | Lai ..................... | A45C 11/00 224/191 |
| 2015/0229746 A1 * | 8/2015 | Bergin ................. | H04M 1/185 455/556.1 |
| 2015/0311941 A1 | 10/2015 | Sorrentino | |
| 2018/0224896 A1 | 8/2018 | Shindo et al. | |
| 2020/0371406 A1 | 11/2020 | Hung | |
| 2022/0114287 A1 * | 4/2022 | DiSalvo ............... | G06F 1/1679 |

* cited by examiner

Primary Examiner — Justin M Larson
(74) Attorney, Agent, or Firm — Grandview Law

(57) ABSTRACT

Systems and methods involve a portable electronic computing device, the system includes a first case section to receive a device portion, and first and second apertures sized and spaced to detachably couple with plug and stem, respectively, of a cover assembly. In addition, other aspects are described in the claims, drawings, and text forming a part of the present disclosure.

17 Claims, 25 Drawing Sheets

CASE FOR PORTABLE ELECTRONIC COMPUTING DEVICE

SUMMARY

In one or more aspects a system can include a system for a portable electronic computing device, the portable electronic computing device including a camera having an image input configured to capture images in a direction from the portable electronic computing device, the system including: (I) a first case section including (A) at least one interior surface, (B) a first side including at least one first wall portion with the at least one first wall portion angularly extending relative to the at least one interior surface, (C) a second side including at least one second wall portion with the at least one second wall portion angularly extending relative to the at least one interior surface, and (D) a third side including at least one third wall portion with the at least one third wall portion angularly extending relative to the at least one interior surface, wherein the at least one first wall portion extends perpendicularly to the second wall portion, and wherein the at least one first wall portion extends parallel with the at least one third wall portion such that the first case section being configured to receive the first portion of the portable electronic computing device, (E) an exterior side, (F) a first aperture through the exterior side, the first aperture sized and positioned to align with the image input of the camera of the portable electronic device when the first case section is removably coupled with the first portion of the portable electronic computing device, and (G) a second aperture through the exterior side spaced a first distance from the first aperture; and (II) a first cover assembly including a plug member and a stem member, the plug member shaped and sized to detachably couple with the first aperture of the first case section, the stem member shaped and sized to detachably couple with the second aperture of the first case section, the plug member and the stem member spaced from one another a second distance to allow for simultaneous coupling of the plug member with the first aperture and the stem member with the second aperture. Wherein the first cover assembly includes an elongated support member including a side, a tab, a periphery, and a rim surface, the tab extending from the side, the rim surface extending along at least one portion of the periphery of the elongated support member, the plug member extending from the elongated support member, wherein the first aperture includes a periphery and the base includes a rim surface extending along at least one portion of the periphery of the first aperture of the base, and wherein at least one portion of the rim surface of the elongated support member is in contact with at least one portion of the rim surface when the plug member of the first cover assembly is being coupled with the first aperture. Wherein the first aperture includes at least one first wall portion, wherein the plug member of the first cover assembly includes at least one second wall portion, and wherein the at least one first wall portion of the first aperture being adjacent with the at least one second wall portion of the plug member when the plug member is being coupled with the first aperture. Wherein the first aperture includes at least one first wall portion and the plug member of the first cover assembly includes at least one second wall portion, and wherein the at least one second wall portion of the plug member of the first cover assembly includes at least one rib portion, and wherein the at least one first wall portion of the first aperture being adjacent with the at least one rib portion of the second wall portion of the plug member when the plug member is being coupled with the first aperture. Wherein the first aperture includes at least one first wall portion and at least one projection portion extending from the at least one first wall portion, wherein the plug member of the first cover assembly includes at least one second wall portion, the at least one second wall portion including at least one notch portion, and wherein the at least one projection portion of the first aperture being coupled with the at least one notch portion of the plug member of the first cover assembly when the plug member of the first cover assembly is being coupled with the first aperture. Wherein the exterior side includes at least one first depressed portion adjacent at least one portion of the first aperture, wherein the first cover assembly includes an elongated support member, the plug member of the first cover assembly extending from the elongated support member, and wherein at least one portion of the elongated support member is received by the at least one first depressed portion of the exterior side when the plug member of the first cover assembly is being coupled with the first aperture. Wherein the second aperture includes a first portion and a second portion, the first portion being proximate to the exterior side of the first case section and the second portion being distal from the exterior side, and wherein the first portion includes a first volumetric dimension and the second portion includes a second volumetric dimension, the first volumetric dimension being greater than the second volumetric dimension. Wherein the stem member of the first cover assembly being in contact with the first portion of the second aperture when the stem member is being coupled with the second aperture, and wherein the stem member of the first cover assembly being free from contact with the second portion of the second aperture when the stem member is being coupled with the second aperture. Wherein the first cover assembly includes an extended member coupled with the stem member and the plug member, wherein the extended member includes a surface portion, wherein the stem member includes a longitudinal dimension being transverse to the surface portion of the extended member, wherein the stem member includes a first portion proximate to the surface portion of the extended member and a second portion distal to the surface portion of the extended member, wherein the first portion of the stem member includes a first dimension transverse to the longitudinal dimension of the stem member, wherein the second portion of the stem member includes a second dimension transverse to the longitudinal dimension of the stem member, and wherein the second dimension of the stem member is greater than the first dimension of the stem member. Wherein the second aperture being in contact with the first portion of the stem member when the stem member is being coupled with the second aperture, and wherein the second aperture being free from contact with the second portion of the stem member when the stem member is being coupled with the second aperture. Wherein the extended member includes a first longitudinal dimension, the first longitudinal dimension including at least one portion of the second distance spacing between the stem member and the plug member. Wherein the exterior side includes at least one second depressed portion adjacent at least one portion of the second aperture of the first case section, and wherein at least one portion of the extended member of the first cover assembly is received by the at least one second depressed portion of the exterior side when the stem member is being coupled with the first aperture. Wherein the extended member includes at least one first exterior surface, wherein the at least one first exterior surface of the extended member includes at least one crease running transverse to the first longitudinal dimension of the extended member, and wherein the at least one crease allows at least in part bending of the extended member along the at least one crease for at least one positioning of the first cover assembly in which the stem member of first cover assembly is coupled with the second aperture of the first case section and the plug member of the first cover assembly is uncoupled from the first aperture of the first case section. Wherein the first case section includes at least one of the following materials: rigid plastic, polycarbonate, acrylonitrile butadiene styrene, thermoplastic polymer, polyethylene terephthalate, and nylon, and wherein the first cover assembly includes at least one of the following materials: silicone, thermoplastic polyurethane, and thermoplastic elastomer.

In one or more aspects, a system can include a system for a first cover assembly including a plug member and a stem member spaced from one another a second distance, the system including (I) a first case section including (A) at least one interior surface, (B) a first side including at least one first wall portion with the at least one first wall portion angularly extending relative to the at least one interior surface, (C) a second side including at least one second wall portion with the at least one second wall portion angularly extending relative to the at least one interior surface, and (D) a third side including at least one third wall portion with the at least one third wall portion angularly extending relative to the at least one interior surface, wherein the at least one first wall portion extends perpendicularly to the second wall portion, and wherein the at least one first wall portion extends parallel with the at least one third wall portion, (E) an exterior side, (F) a first aperture through the exterior side, the first aperture sized and positioned to removably couple with the plug member of the first cover assembly, and (G) a second aperture through the exterior side, the second aperture sized and positioned to removably couple with the stem member of the first cover assembly, wherein the first aperture is spaced a first distance from the second aperture to allow for simultaneous coupling of the plug member of the first cover assembly with the first aperture and the stem member of the first cover assembly with the second aperture. Wherein the first aperture includes at least one first wall portion and at least one projection portion extending from the at least one first wall portion, the at least one projection portion configured to engage with a notch portion of the first cover assembly. Wherein the exterior side includes at least one first depressed portion adjacent at least one portion of the first aperture, the at least one first depressed portion sized and shaped to receive an elongated support member of the first cover assembly.

In one or more aspects, a system can include a system for a first case section with first and second apertures spaced apart a first distance, the first cover assembly including (I) a plug member; and (II) a stem member, wherein the plug member shaped and sized to detachably couple with the first aperture of the first case section, the stem member shaped and sized to detachably couple with the second aperture of the first case section, the plug member and the stem member spaced from one another a second distance to allow for simultaneous coupling of the plug member with the first aperture and the stem member with the second aperture. Wherein the plug member of the first cover assembly includes at least one second wall portion, and wherein the at least one second wall portion of the plug member of the first cover assembly includes at least one rib portion. Wherein the first cover assembly includes an extended member coupled with the stem member and the plug member, wherein the extended member includes a surface portion, wherein the stem member includes a longitudinal dimension being transverse to the surface portion of the extended member, wherein the stem member includes a first portion proximate to the surface portion of the extended member and a second portion distal to the surface portion of the extended member, wherein the first portion of the stem member includes a first dimension transverse to the longitudinal dimension of the stem member, wherein the second portion of the stem member includes a second dimension transverse to the longitudinal dimension of the stem member, and wherein the second dimension of the stem member is greater than the first dimension of the stem member.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a case for portable electronic computing device systems, articles of manufacture, compositions of matter for same that may provide context, for instance, in introducing one or more processes and/or devices described herein.

DETAILED DESCRIPTION

Figure 1:
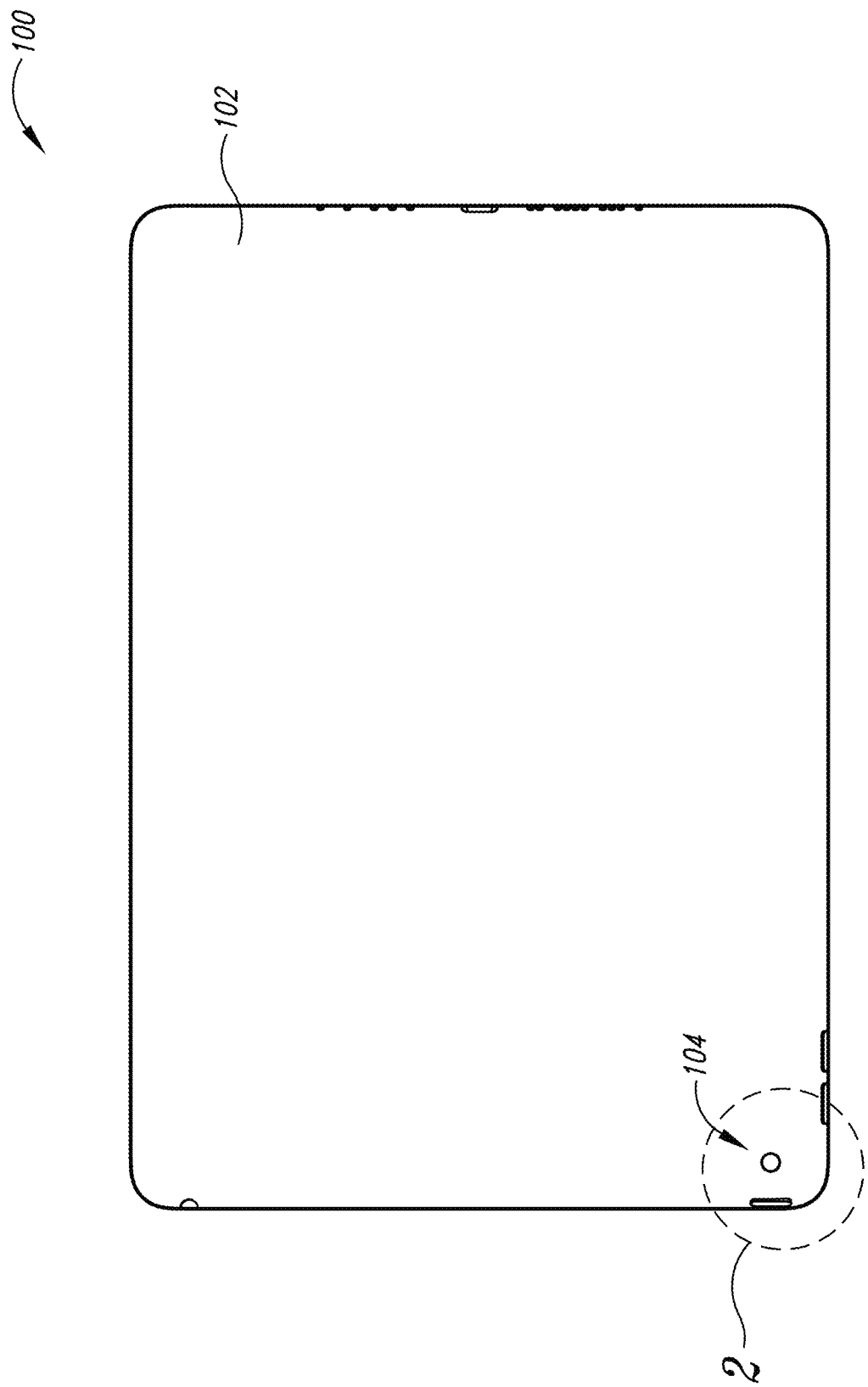
FIG. 1 is a front elevational view of a conventional portable electronic device.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front elevational view of a conventional portable electronic device such as but not limited to a tablet, a laptop, etc. In implementations, portable electronic device 100 is shown to include exterior side 102, and camera 104.

Figure 1A:
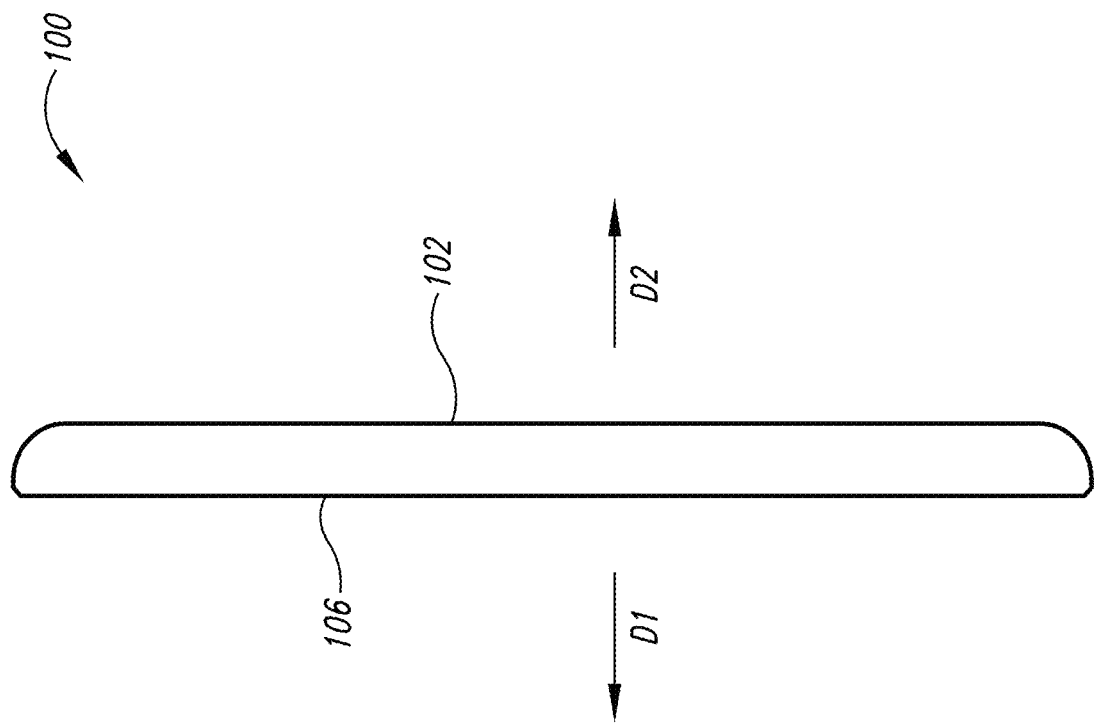
FIG. 1A is a side elevational view of the conventional portable electronic device.

Turning to FIG. 1A, depicted therein is a side elevational view of the conventional portable electronic device. In implementations, portable electronic device 100 is shown to include display 106 facing in direction D1, and exterior side 102 facing in direction D2.

Figure 2:
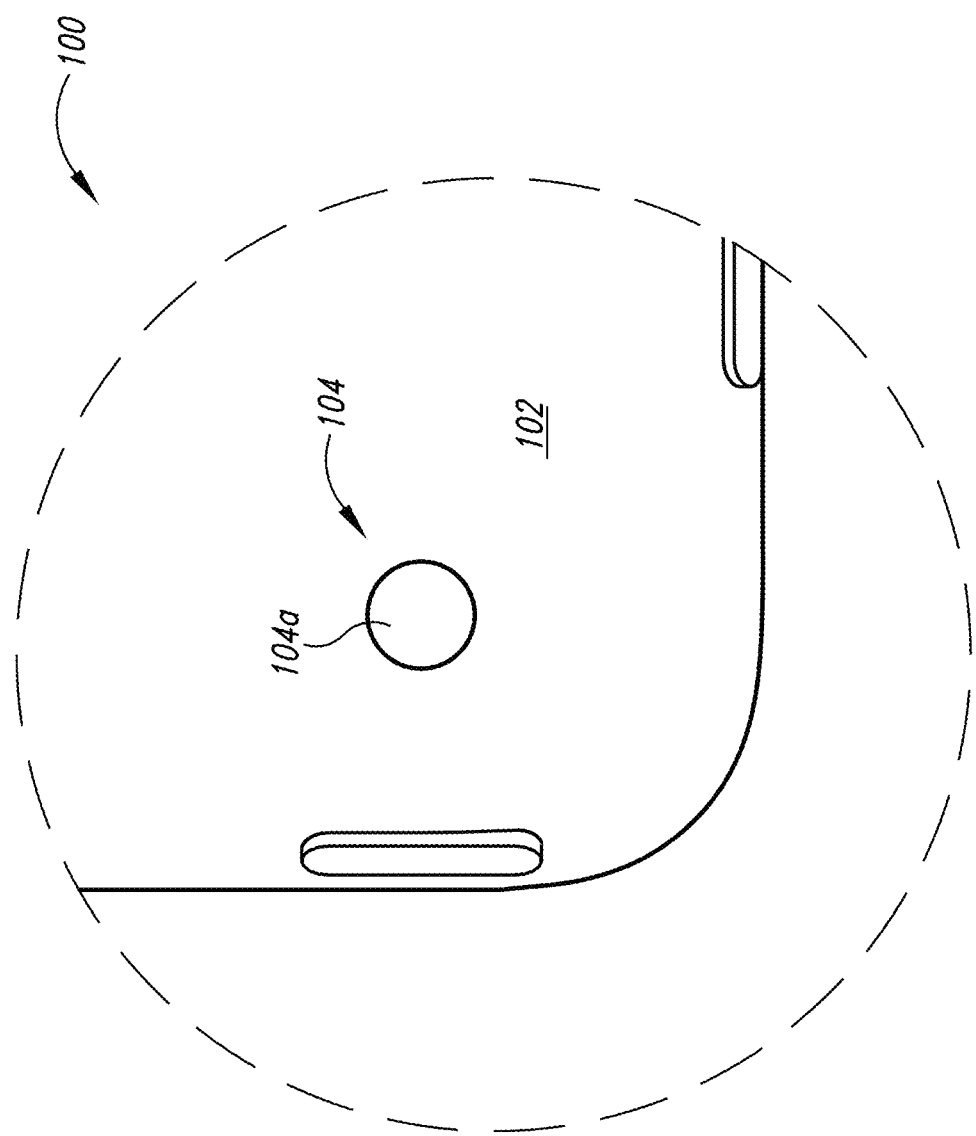
FIG. 2 is an enlarged front elevational view of a portion of the conventional portable electronic device of FIG. 1.

Turning to FIG. 2, depicted therein is an enlarged front elevational view of a portion of the conventional portable electronic device of FIG. 1. In implementations, camera 104 of portable electronic device 100 is shown to include image input 104a.

Figure 3:
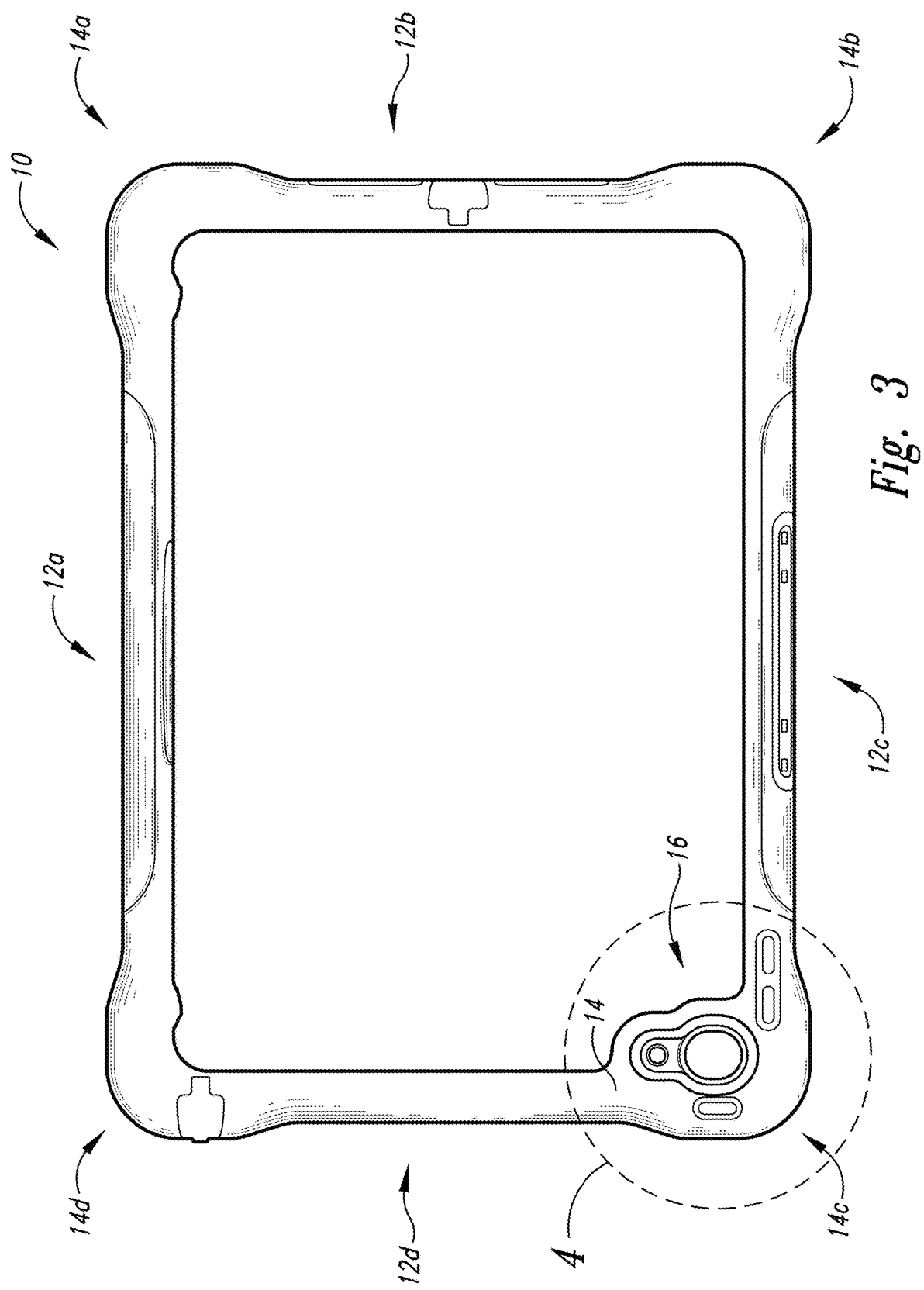
FIG. 3 front elevational view of a case for a portable electronic device.

Turning to FIG. 3, depicted therein front elevational view of a case for a portable electronic device. In implementations, device case assembly 10 is shown to include side 12a, side 12b, side 12c, and side 12d. In implementations, device case assembly 10 is further shown to include exterior side 14, corner 14a, corner 14b, corner 14c, corner 14d, and cover engagement assembly 16.

Figure 4:
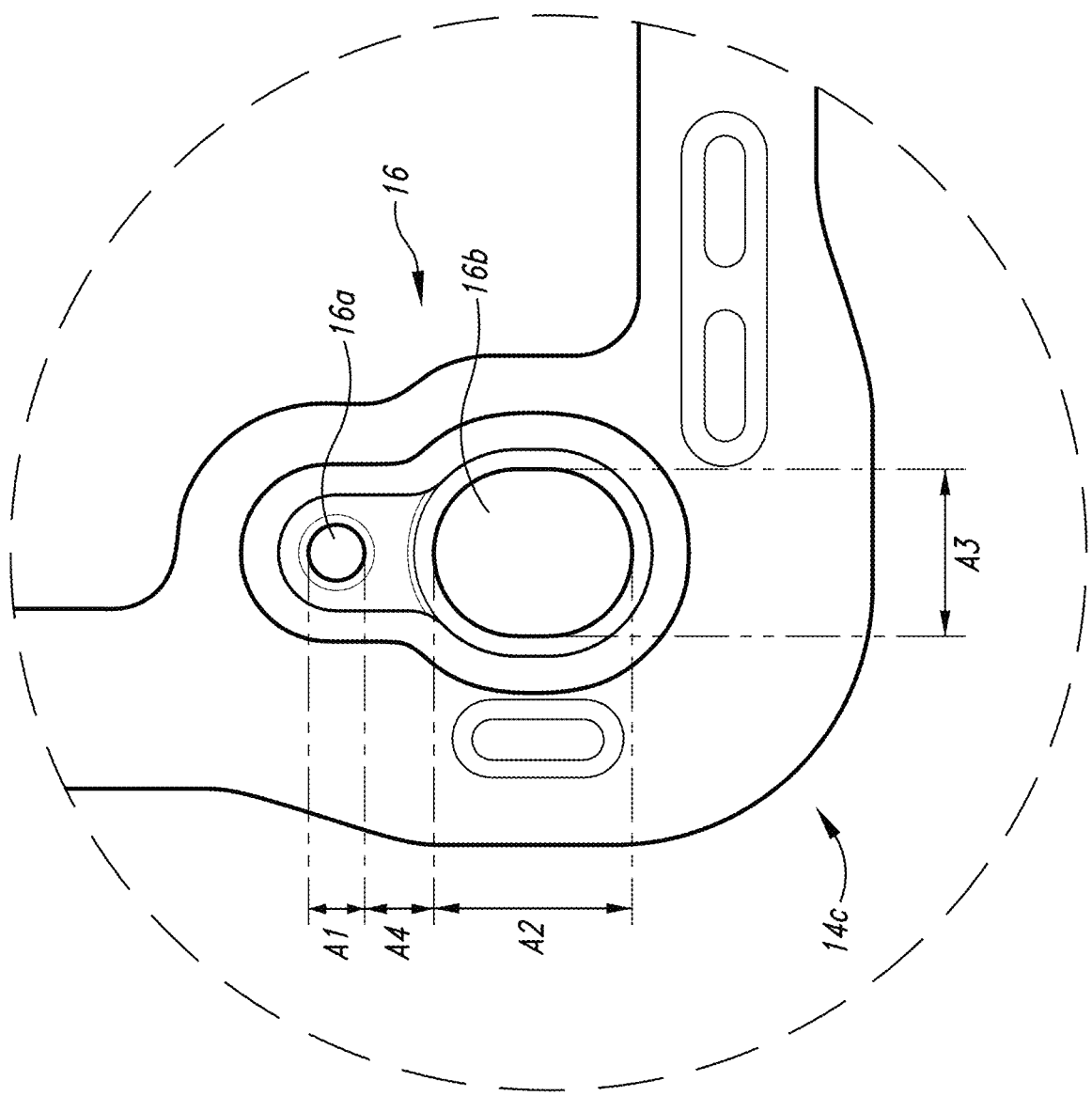
FIG. 4 is an enlarged front elevational view of a portion of the case for a portable electronic device of FIG. 3.

Turning to FIG. 4, depicted therein is an enlarged front elevational view of a portion of the case for a portable electronic device of FIG. 3. In implementations, cover engagement assembly 16 is shown to include aperture 16a, and aperture 16b. In implementations, cover engagement assembly 16 is further shown to include linear dimension A1, linear dimension A2, linear dimension A3, and linear dimension A4.

Figure 5:
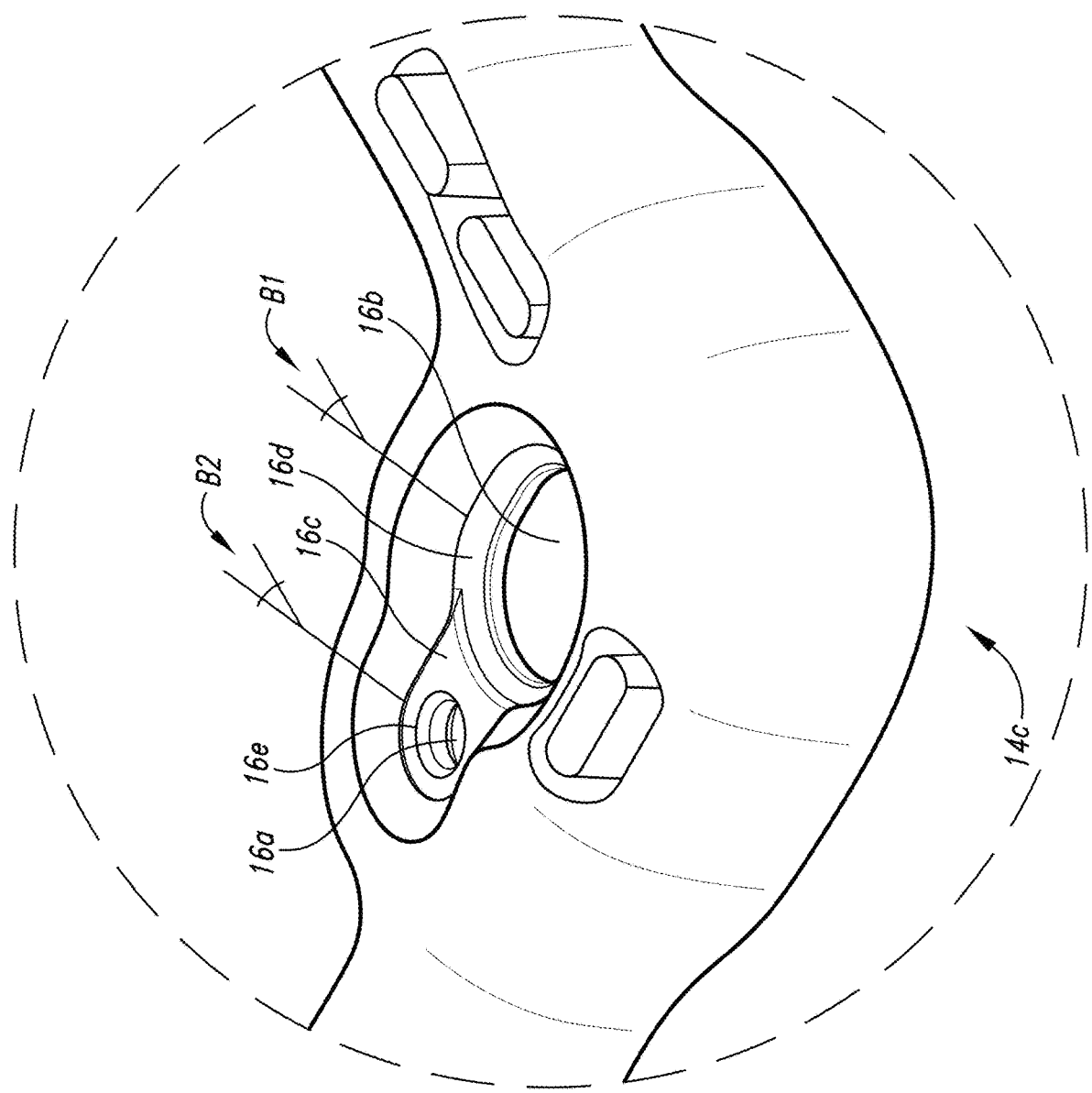
FIG. 5 is a first enlarged perspective view of the portion of the case for a portable electronic device of FIG. 4.

Turning to FIG. 5, depicted therein is a first enlarged perspective view of the portion of the case for a portable electronic device of FIG. 4. In implementations, cover engagement assembly 16 is shown to include rim portion 16c, wall portion 16d, and wall portion 16e. In implementations, cover engagement assembly 16 is further shown to include depressed portion angular dimension B1, and depressed portion angular dimension B2.

Figure 6:
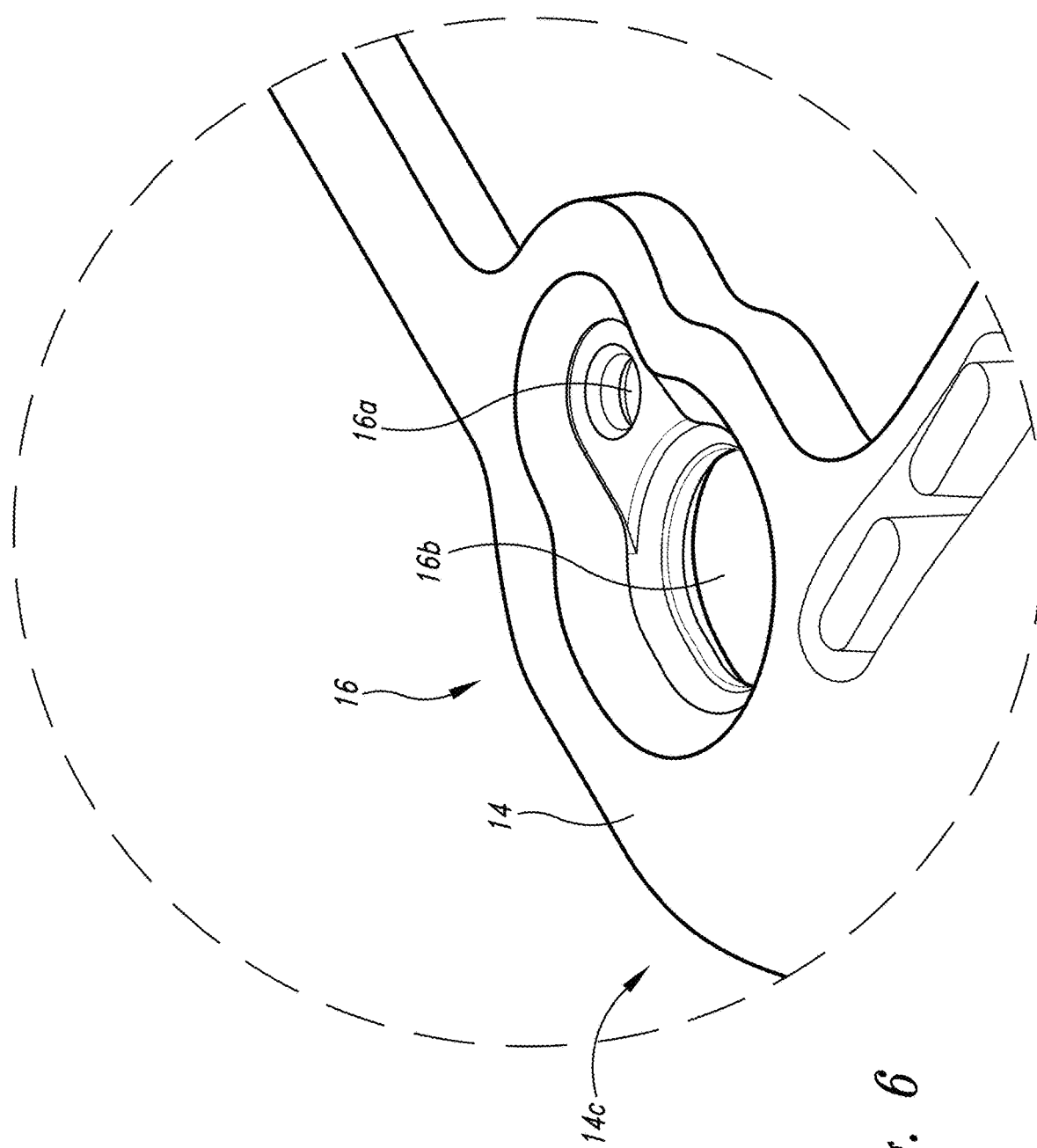
FIG. 6 is a second enlarged perspective view of the portion of the case for a portable electronic device of FIG. 4.

Turning to FIG. 6, depicted therein is a second enlarged perspective view of the portion of the case for a portable electronic device of FIG. 4.

Figure 7:
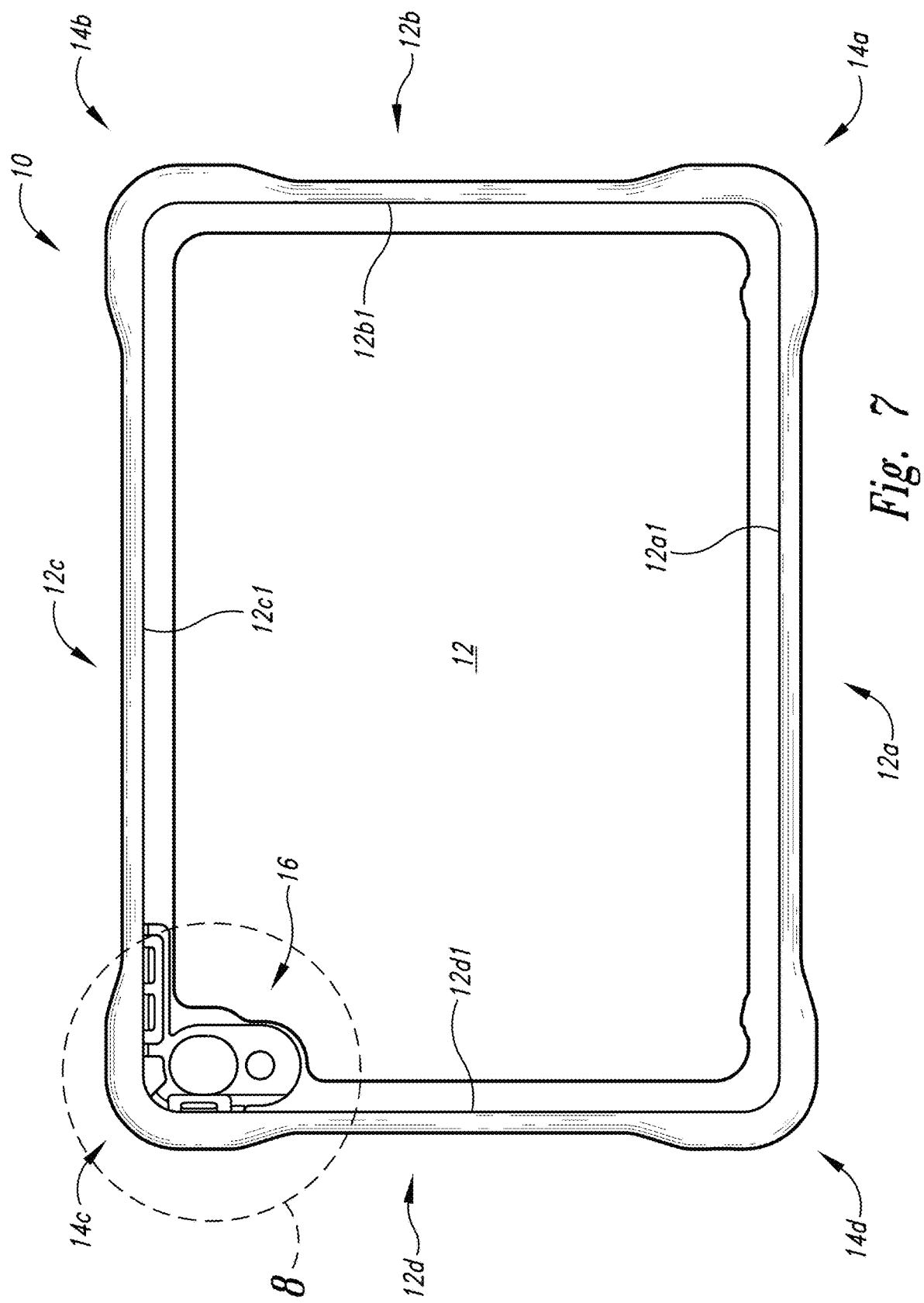
FIG. 7 is a rear elevational view of the case for a portable electronic device of FIG. 3.

Turning to FIG. 7, depicted therein is a rear elevational view of the case for a portable electronic device of FIG. 3. In implementations, device case assembly 10 is shown to include interior surface 12, side 12a of device case assembly 10 is shown to include wall 12a1, side 12b of device case assembly 10 is shown to include wall 12b1, side 12c of device case assembly 10 is shown to include wall 12c1, and side 12d of device case assembly 10 is shown to include wall 12d1.

Figure 8:
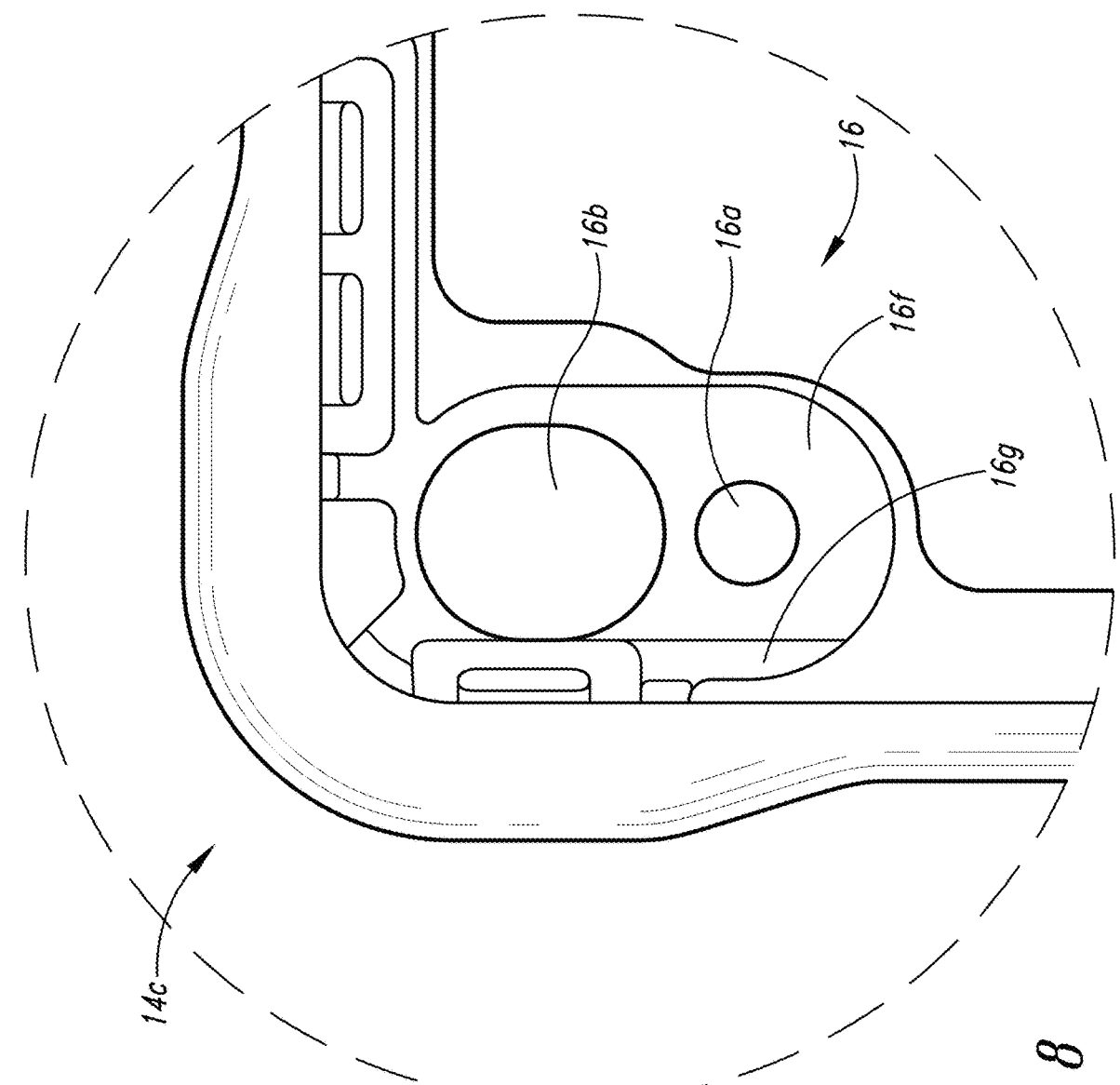
FIG. 8 is an enlarged rear elevational view of a portion of the case for a portable electronic device of FIG. 7.

Turning to FIG. 8, depicted therein is an enlarged rear elevational view of a portion of the case for a portable electronic device of FIG. 7. In implementations, cover engagement assembly 16 is shown to include inner surface 16f, and inner wall 16g.

Figure 9:
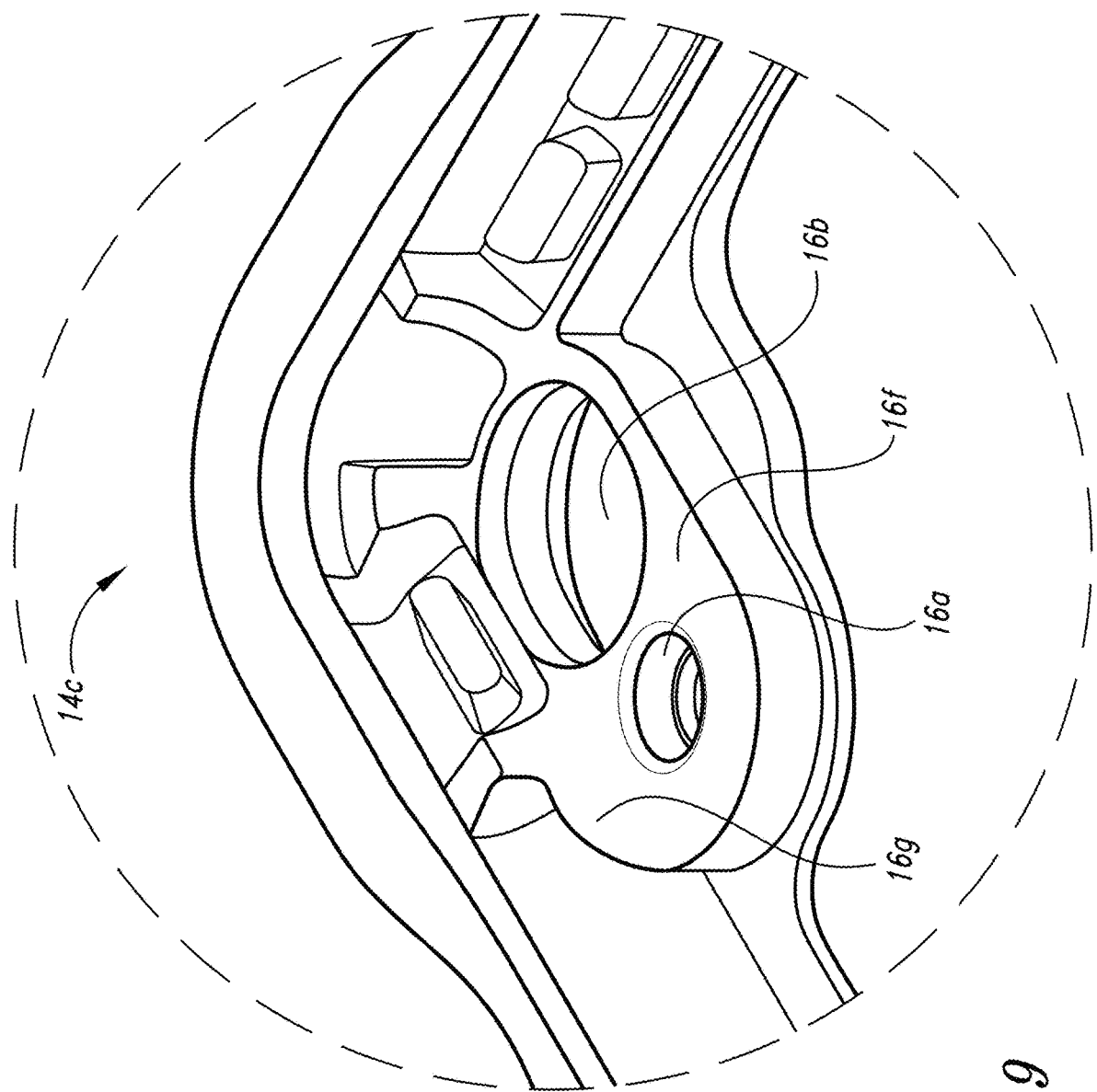
FIG. 9 is an enlarged perspective view of the portion of the case for a portable electronic device of FIG. 7.

Turning to FIG. 9, depicted therein is an enlarged perspective view of the portion of the case for a portable electronic device of FIG. 7.

Figure 10:
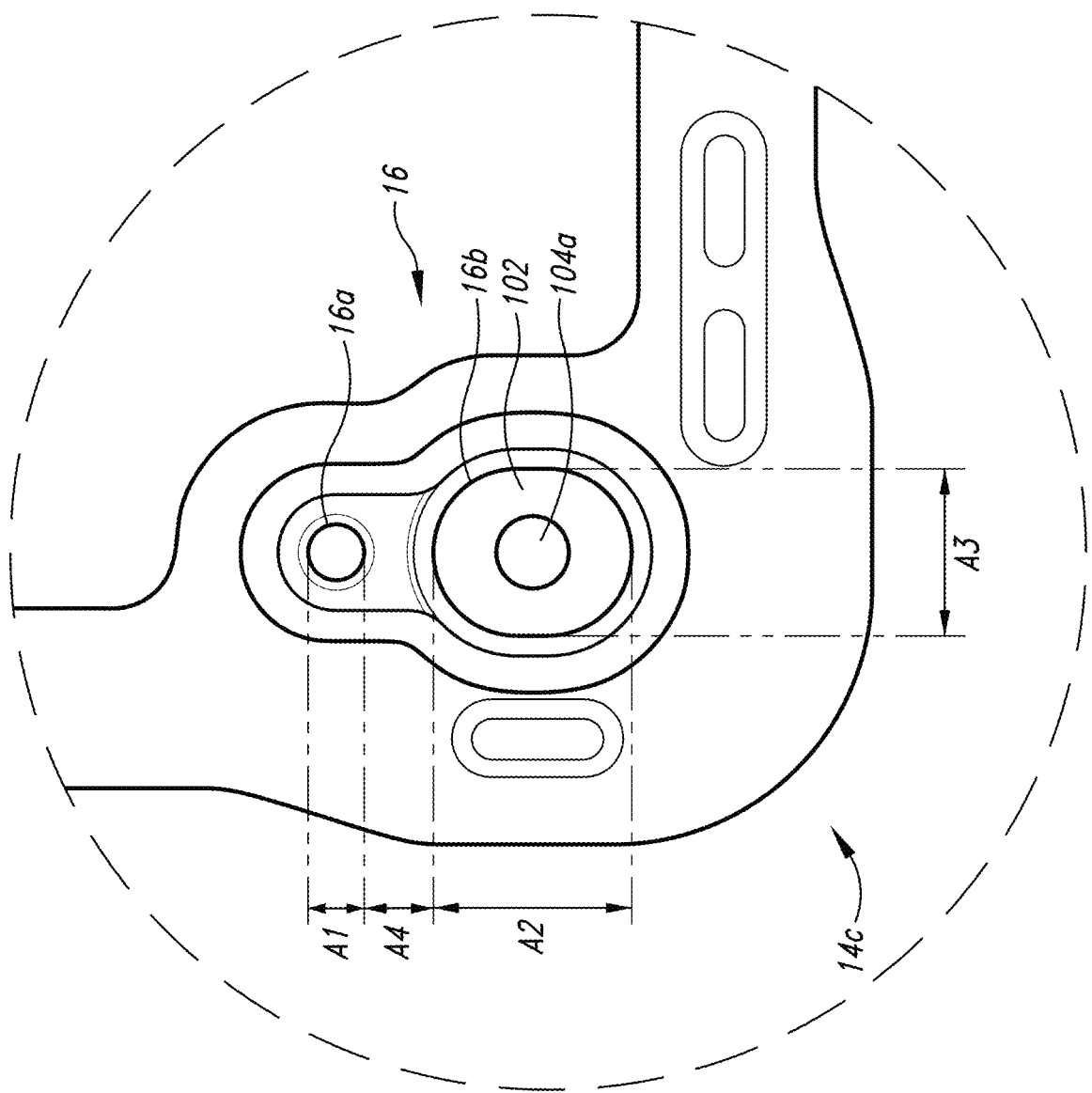
FIG. 10 is an enlarged front elevational view of a portion of the conventional portable electronic device of FIG. 1 and an enlarged front elevational view of a portion of the case for a portable electronic device of FIG. 3 containing the conventional portable electronic device.

Turning to FIG. 10, depicted therein is an enlarged front elevational view of a portion of the conventional portable electronic device of FIG. 1 and an enlarged front elevational view of a portion of the case for a portable electronic device of FIG. 3 containing the conventional portable electronic device.

Figure 11:
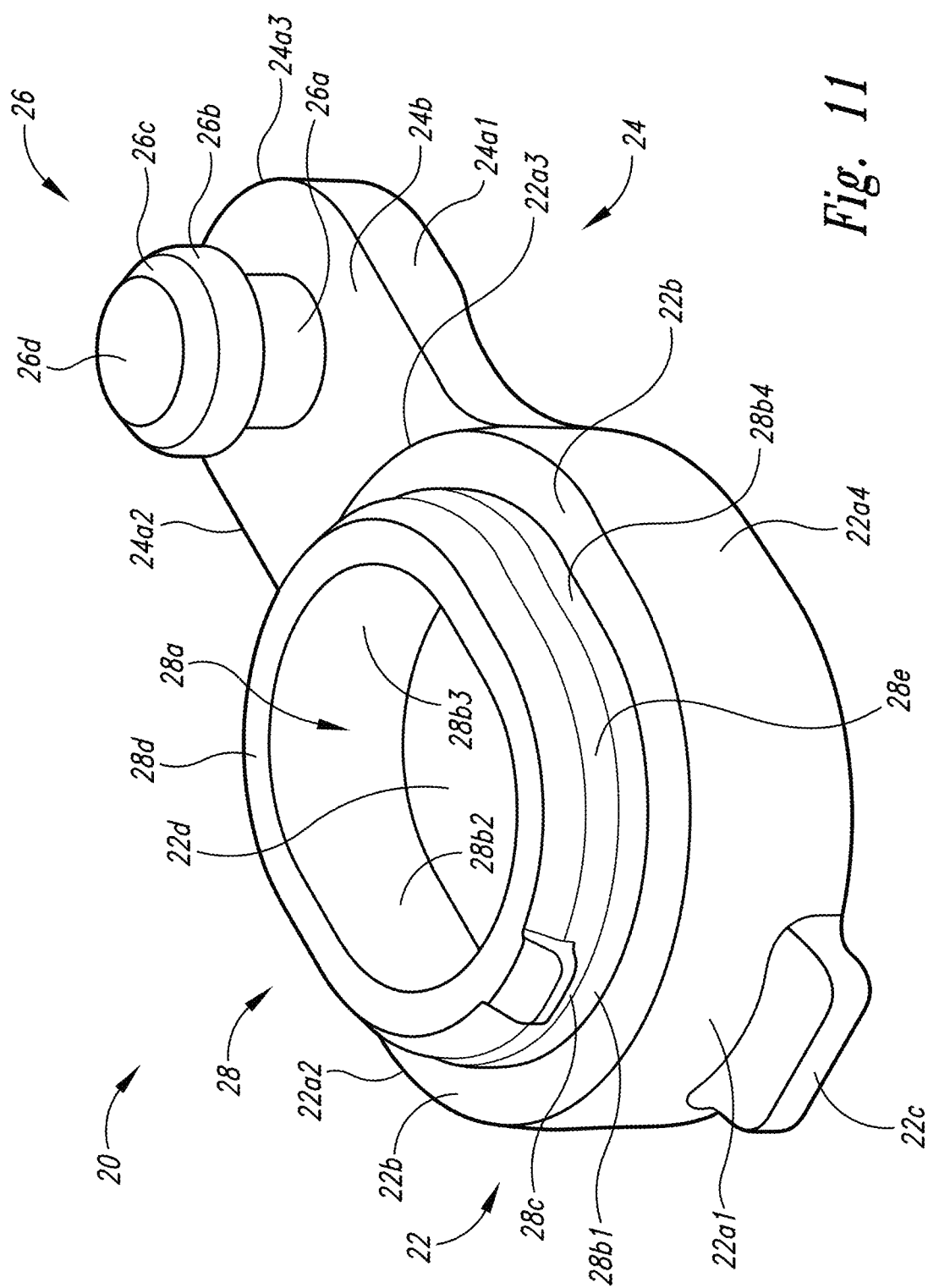
FIG. 11 is a rear perspective view of a cover assembly.

Turning to FIG. 11, depicted therein is a rear perspective view of a cover assembly. In implementations, cover assembly 20 is shown to include support member 22, extended member 24, stem 26, and plug 28.

In implementations, support member 22 is shown to include side 22a1, side 22a2, side 22a3, and side 22a4. In implementations, support member 22 is further shown to include rim 22b, tab 22c, and periphery 22d.

In implementations, extended member 24 is shown to include side 24*a*1, side 24*a*2, side 24*a*3, and surface 24*b*.

In implementations, stem 26 is shown to include post 26*a*, projection portion 26*b*, tapered portion 26*c*, and tip 26*d*.

In implementations, plug 28 is shown to include opening 28*a*, side 28*b*1, side 28*b*2, side 28*b*3, and side 28*b*4. In implementations, plug 28 is further shown to include notch 28*c*, rim 28*d*, and rib 28*e*.

Figure 12:
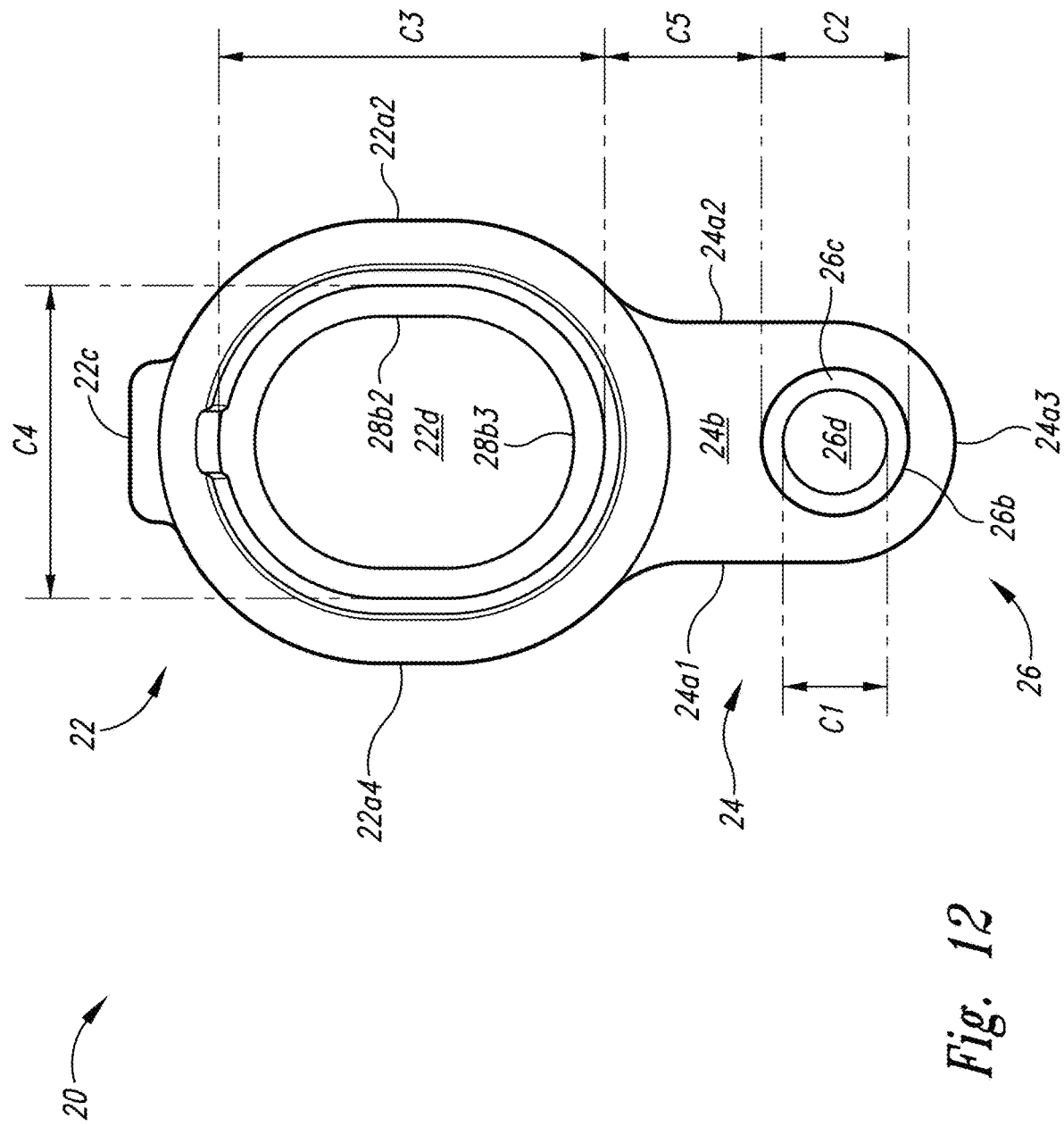
FIG. 12 is rear elevational view of the cover assembly of FIG. 11.

Turning to FIG. 12, depicted therein is rear elevational view of the cover assembly of FIG. 11. In implementations, cover assembly 20 is shown to include linear dimension C1, linear dimension C2, linear dimension C3, linear dimension C4, and linear dimension C5.

Figure 13:
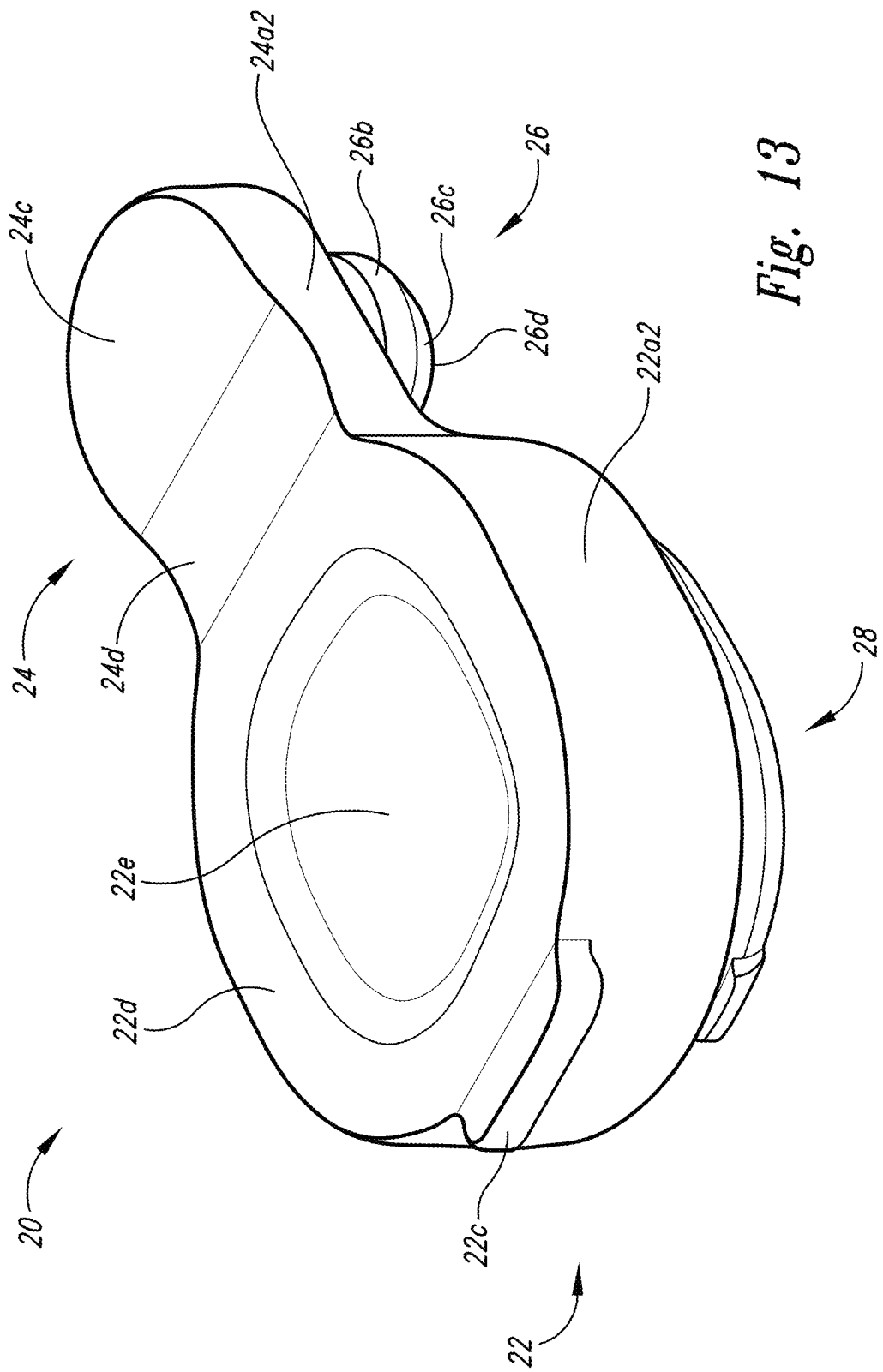
FIG. 13 is a front perspective view of the cover assembly of FIG. 11.

Turning to FIG. 13, depicted therein is a front perspective view of the cover assembly of FIG. 11. In implementations, cover assembly 20 is shown to include periphery 22*d*, depression 22*e*, surface 24*c*, and crease portion 24*d*.

Figure 14:
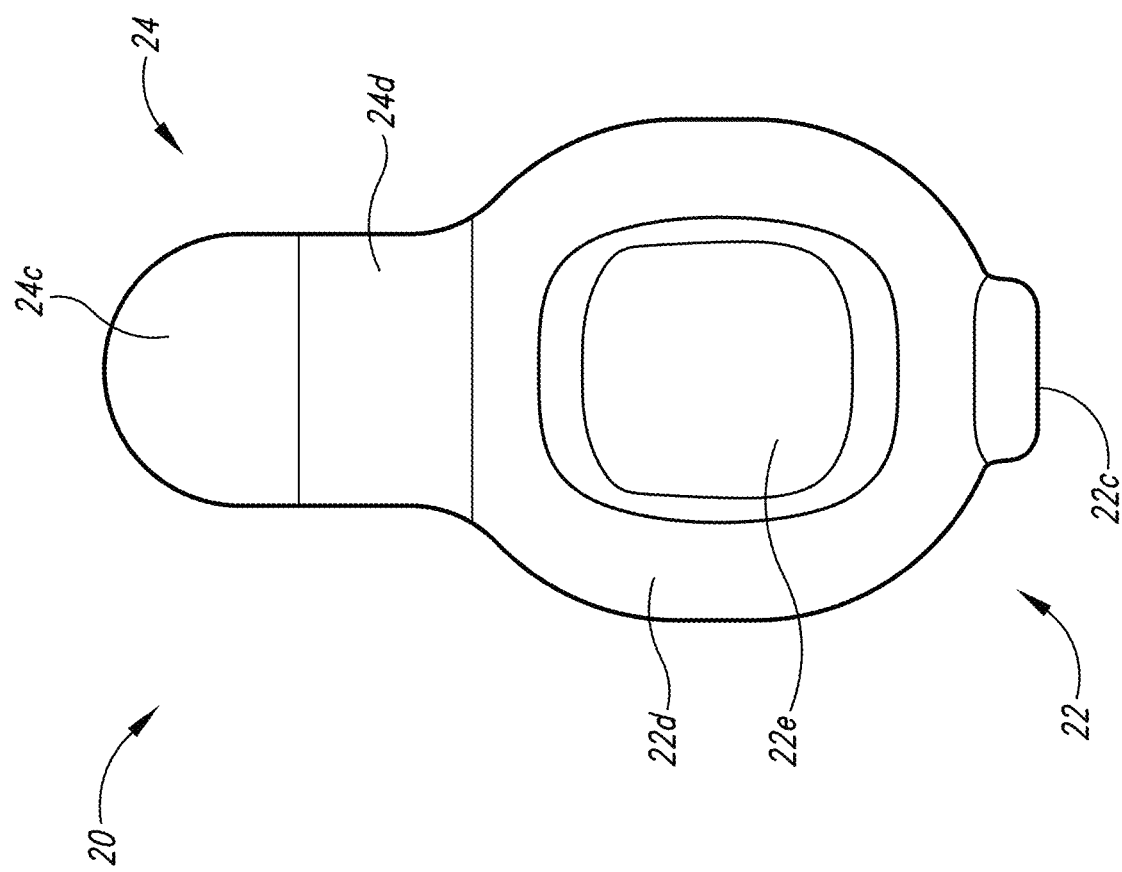
FIG. 14 is front elevational view of the cover assembly of FIG. 11.

Turning to FIG. 14, depicted therein is front elevational view of the cover assembly of FIG. 11.

Figure 15:
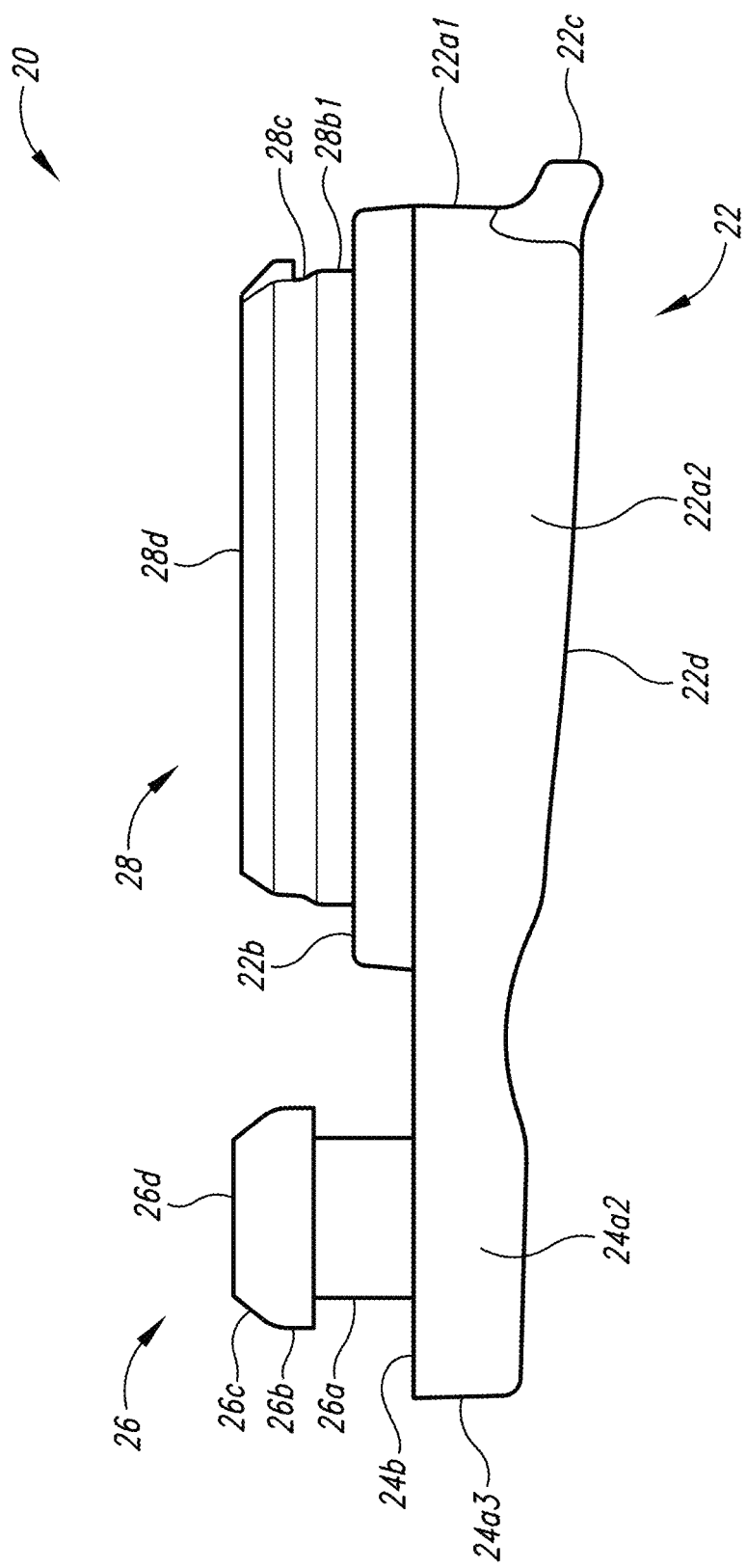
FIG. 15 is side elevational view of the cover assembly of FIG. 11.

Turning to FIG. 15, depicted therein is side elevational view of the cover assembly of FIG. 11.

Figure 16:
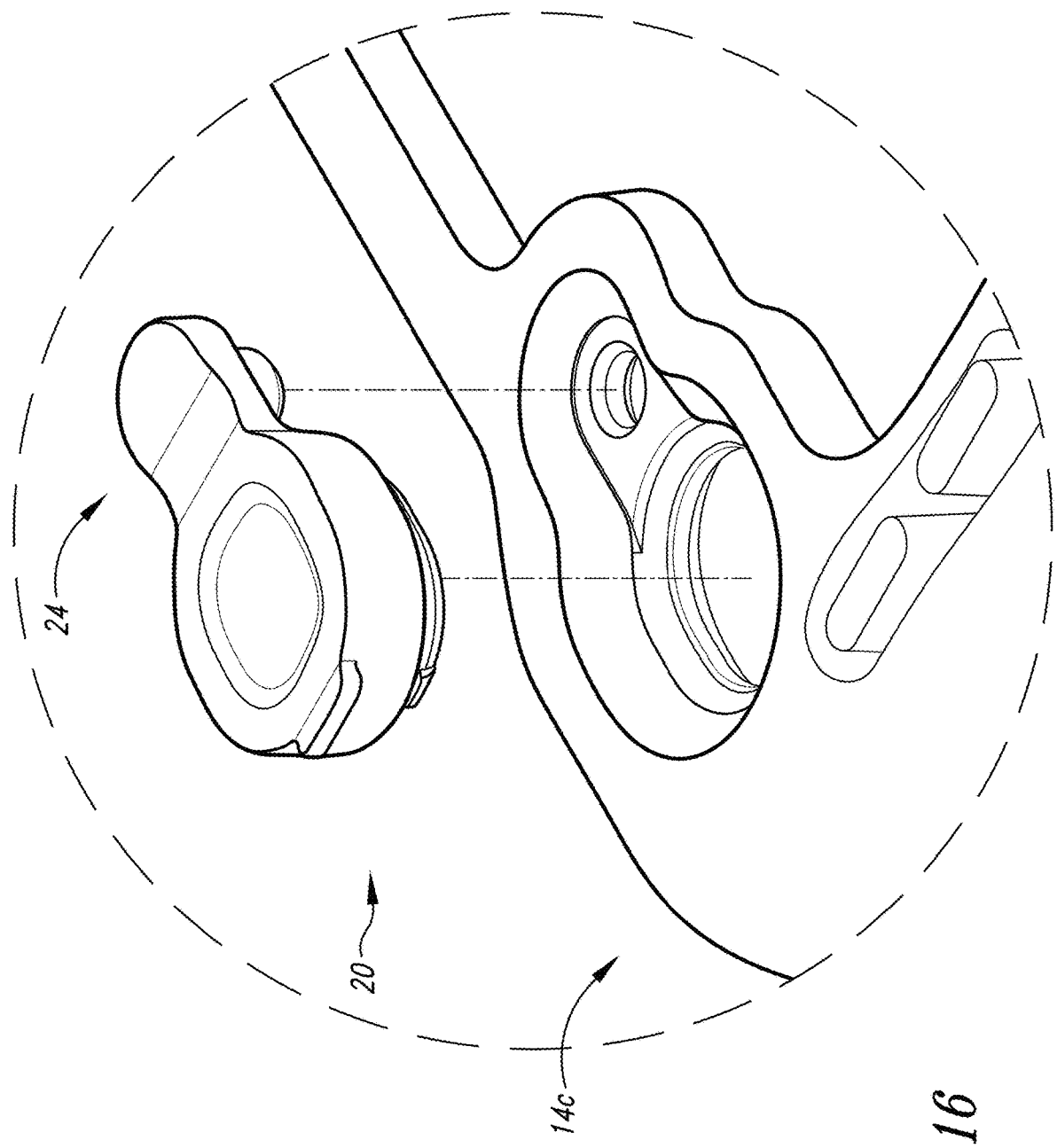
FIG. 16 is front perspective view of the cover assembly of FIG. 13 and the second enlarged perspective view of the portion of the case for a portable electronic device of FIG. 6 with the cover assembly being positioned to be coupled to the case.

Turning to FIG. 16, depicted therein is front perspective view of the cover assembly of FIG. 13 and the second enlarged perspective view of the portion of the case for a portable electronic device of FIG. 6 with the cover assembly being positioned to be coupled to the case.

Figure 17:
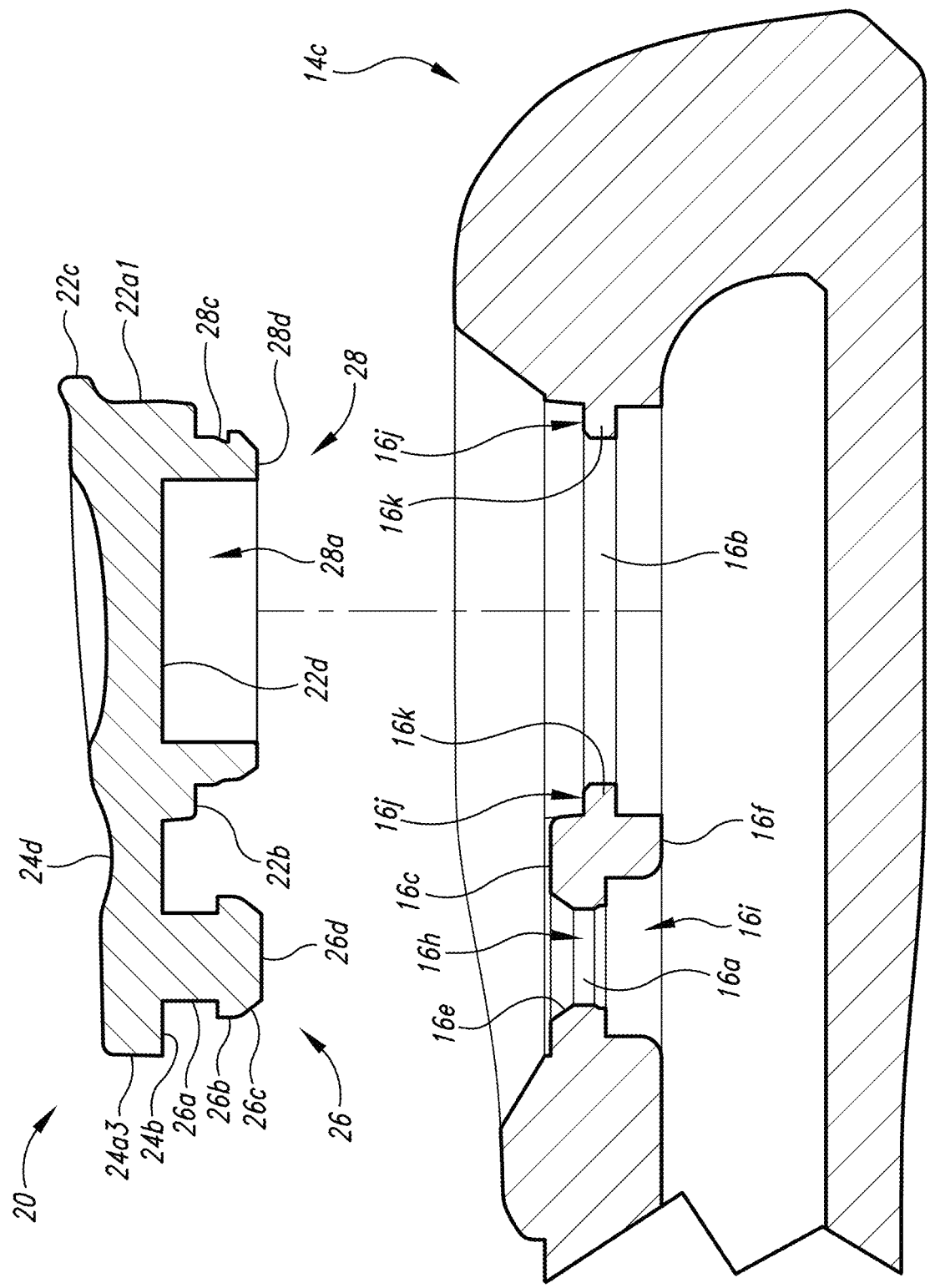
FIG. 17 is a cross-sectional side-elevational view of the cover assembly of FIG. 13 and a cross-sectional side-elevational view of the portion of the case for a portable electronic device of FIG. 4 with the cover assembly being positioned to be coupled to the case.

Turning to FIG. 17, depicted therein is a cross-sectional side-elevational view of the cover assembly of FIG. 13 and a cross-sectional side-elevational view of the portion of the case for a portable electronic device of FIG. 4 with the cover assembly being positioned to be coupled to the case. In implementations, cover engagement assembly 16 is shown to include aperture portion 16*h*, aperture portion 16*i*, rim surface 16*j*, and rim projection 16*k*.

Figure 18:
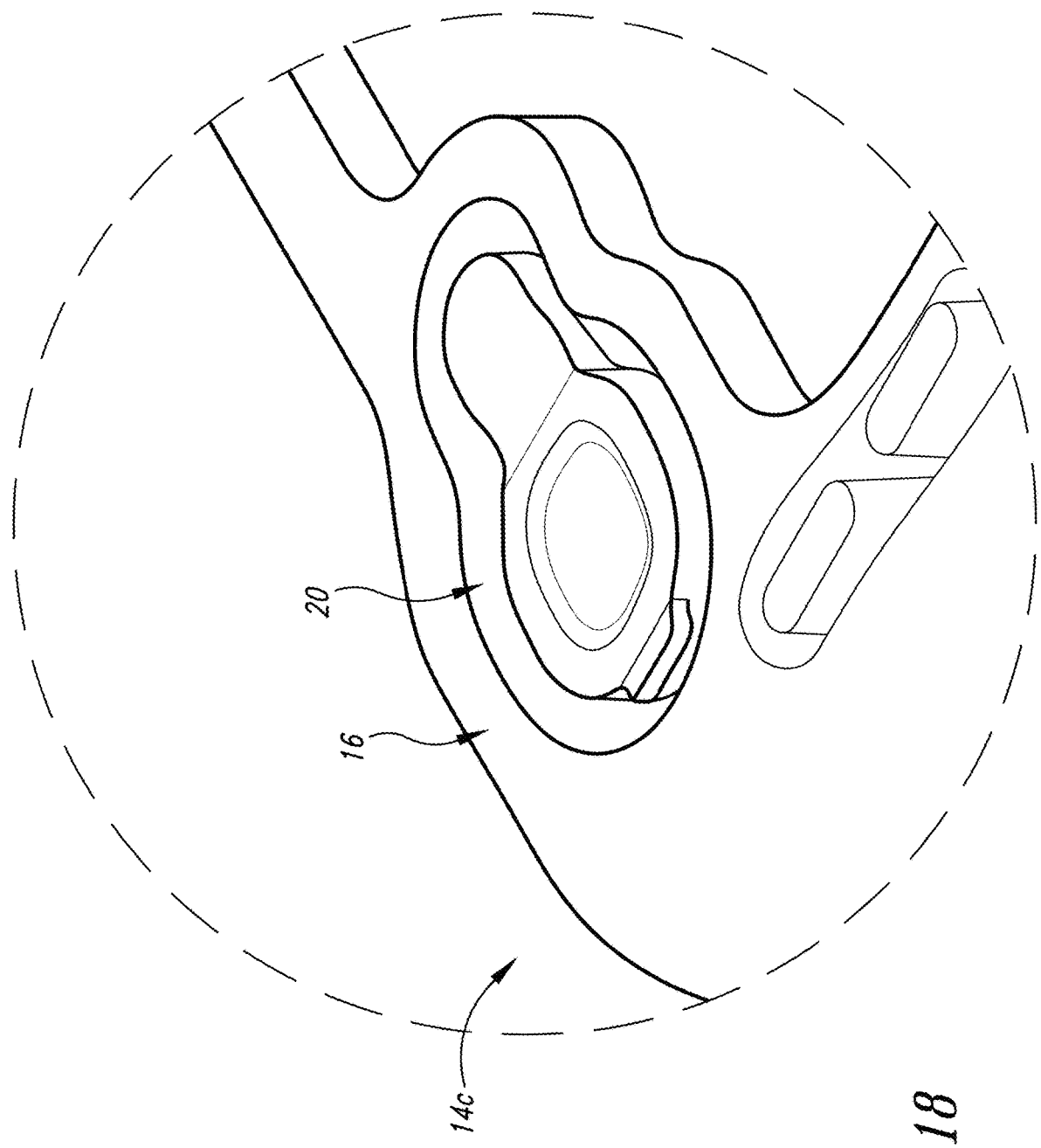
FIG. 18 is the front perspective view of the cover assembly of FIG. 13 and the second enlarged perspective view of the portion of the case for a portable electronic device of FIG. 6 with the cover assembly coupled to the case.

Turning to FIG. 18, depicted therein is the front perspective view of the cover assembly of FIG. 13 and the second enlarged perspective view of the portion of the case for a portable electronic device of FIG. 6 with the cover assembly coupled to the case.

Figure 19:
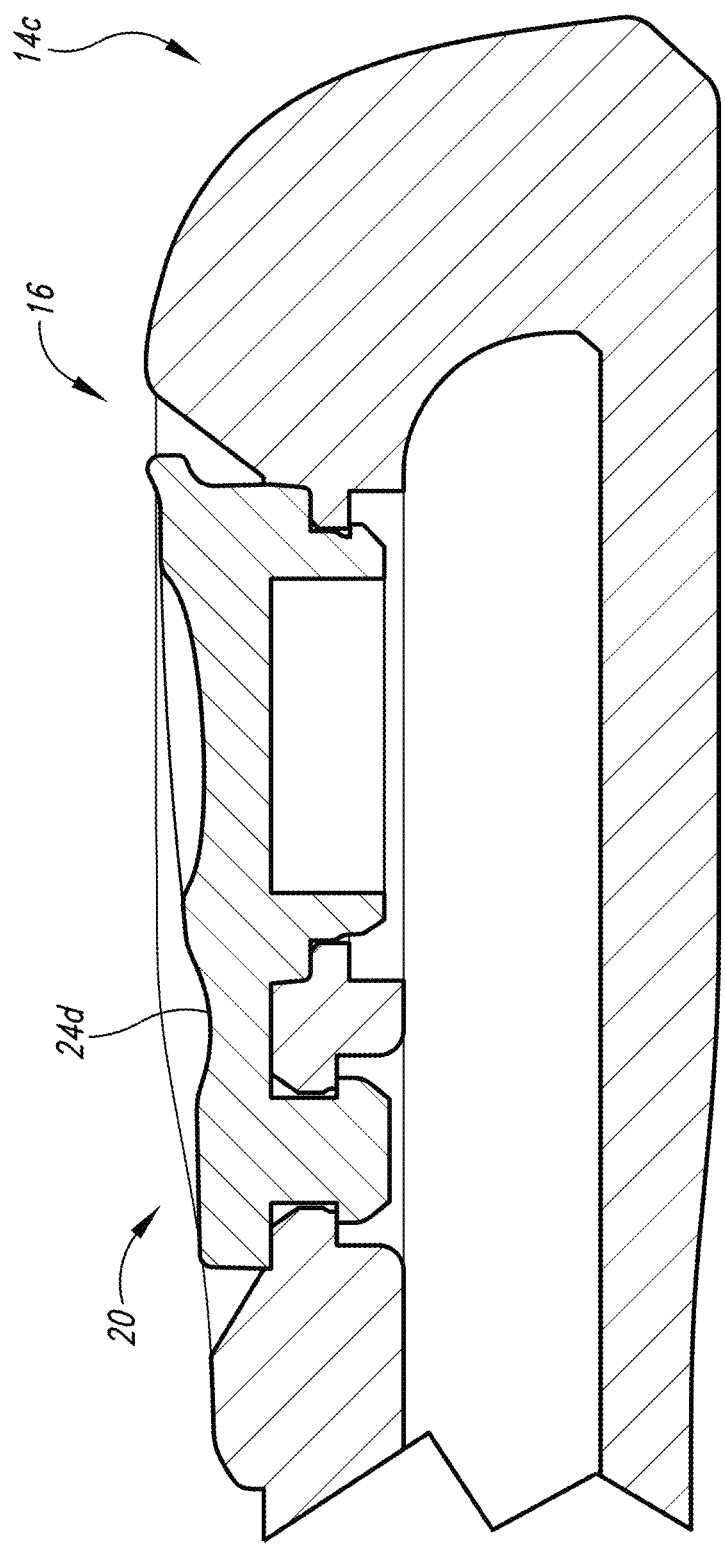
FIG. 19 is a cross-sectional side-elevational view of the cover assembly of FIG. 13 and a cross-sectional side-elevational view of the portion of the case for a portable electronic device of FIG. 4 with the cover assembly coupled to the case.

Turning to FIG. 19, depicted therein is a cross-sectional side-elevational view of the cover assembly of FIG. 13 and a cross-sectional side-elevational view of the portion of the case for a portable electronic device of FIG. 4 with the cover assembly coupled to the case.

Figure 20:
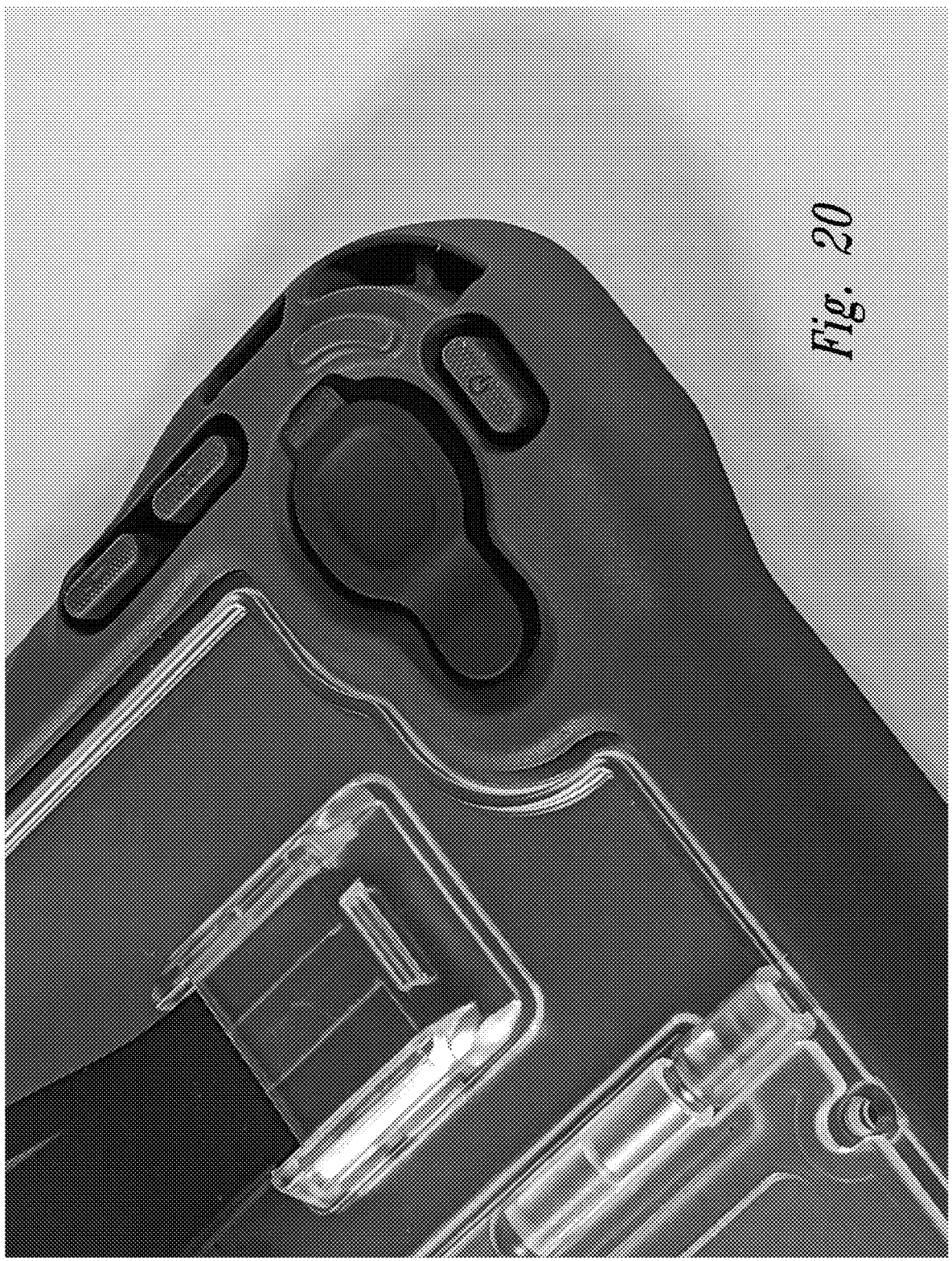
FIG. 20 is a front perspective view of the cover assembly of FIG. 13 and a perspective view of a portion of the case for a portable electronic device of FIG. 3 with the cover assembly in a first position with its plug and stem both coupled to the case.

Turning to FIG. 20, depicted therein is a front perspective view of the cover assembly of FIG. 13 and a perspective view of a portion of the case for a portable electronic device of FIG. 3 with the cover assembly in a first position with its plug and stem both coupled to the case.

Figure 21:
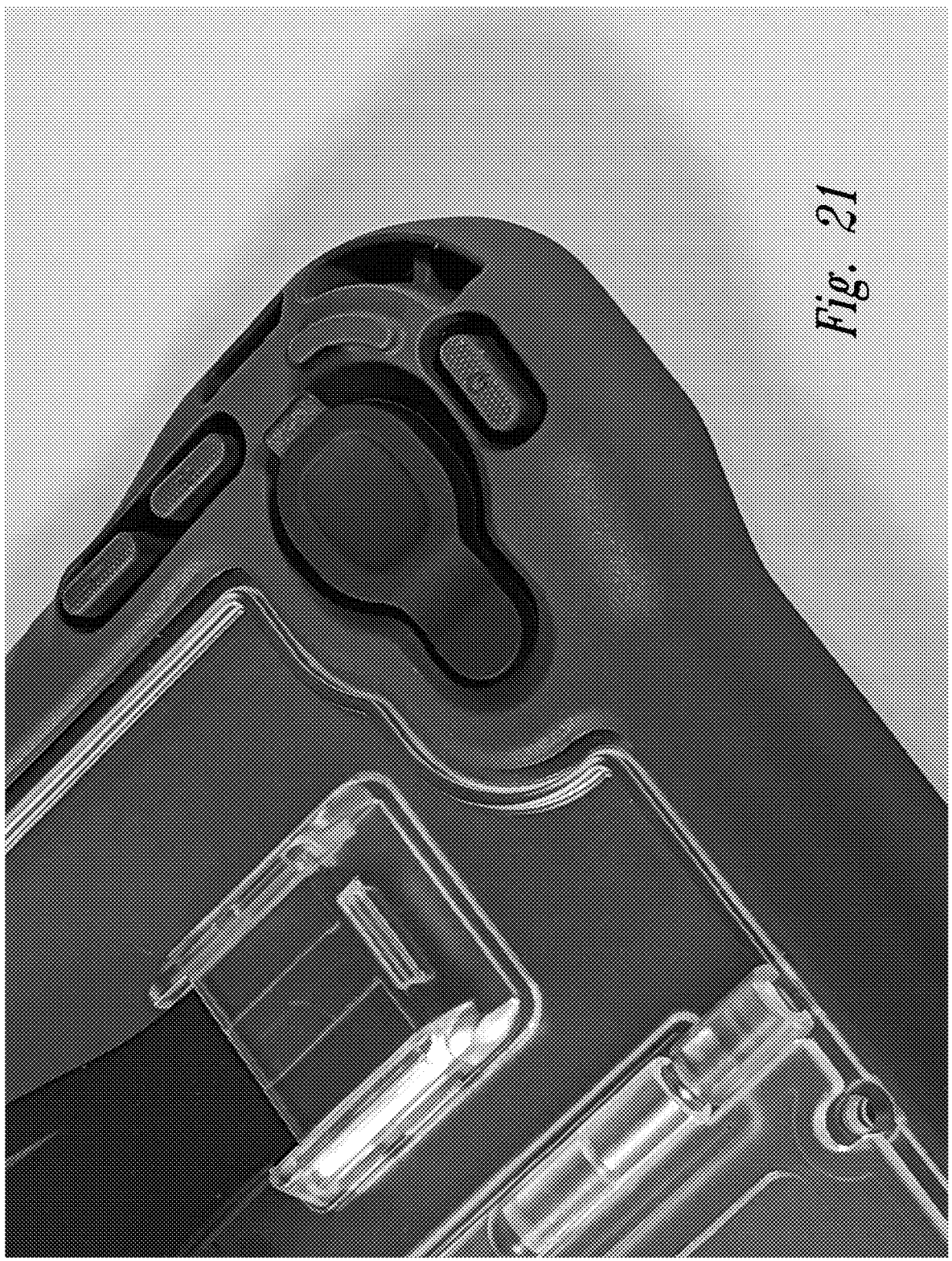
FIG. 21 is a front perspective view of the cover assembly of FIG. 13 and a perspective view of a portion of the case for a portable electronic device of FIG. 3 with the cover assembly in a second position with its plug semi-uncoupled from the case and its stem coupled to the case.

Turning to FIG. 21, depicted therein is a front perspective view of the cover assembly of FIG. 13 and a perspective view of a portion of the case for a portable electronic device of FIG. 3 with the cover assembly in a second position with its plug partially uncoupled from the case and its stem coupled to the case.

Figure 22:
FIG. 22 is a front perspective view of the cover assembly of FIG. 13 and a perspective view of a portion of the case for a portable electronic device of FIG. 3 with the cover assembly in a third position with its plug uncoupled from the case and its stem coupled to the case.

Turning to FIG. 22, depicted therein is a front perspective view of the cover assembly of FIG. 13 and a perspective view of a portion of the case for a portable electronic device of FIG. 3 with the cover assembly in a third position with its plug uncoupled from the case and its stem coupled to the case.

Figure 23:
FIG. 23 is a front perspective view of the cover assembly of FIG. 13 and a perspective view of a portion of the case for a portable electronic device of FIG. 3 with the cover assembly in a fourth position with its plug uncoupled from the case and its stem coupled to the case.

Turning to FIG. 23, depicted therein is a front perspective view of the cover assembly of FIG. 13 and a perspective view of a portion of the case for a portable electronic device of FIG. 3 with the cover assembly in a fourth position with its plug uncoupled from the case and its stem coupled to the case.

Figure 24:
FIG. 24 is a front perspective view of the cover assembly of FIG. 13 and a perspective view of a portion of the case for a portable electronic device of FIG. 3 with the cover assembly in a fifth position with its plug uncoupled from the case and its stem coupled to the case.

Turning to FIG. 24, depicted therein is a front perspective view of the cover assembly of FIG. 13 and a perspective view of a portion of the case for a portable electronic device of FIG. 3 with the cover assembly in a fifth position with its plug uncoupled from the case and its stem coupled to the case. As shown in FIGS. 22-24, the third, fourth, and fifth positions include crease portion 24*d* of cover assembly 20 being partially bent to accommodate plug 28 being uncoupled from aperture 16*b* while stem 26 remains coupled to aperture 16*a*. Other implementations of extended member 24 of cover assembly 20 are without crease portion 24*d* but extended member 24 can partially bend to accommodate plug 28 being uncoupled from aperture 16*b* while stem 26 remains coupled to aperture 16*a* for the third, fourth, and fifth positions since materials used for extended member 24 can include silicone, thermoplastic polyurethane, and thermoplastic elastomer whereas materials for device case assembly 10 can include rigid plastic, polycarbonate, acrylonitrile butadiene styrene, thermoplastic polymer, polyethylene terephthalate, and nylon.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic computing device, the portable electronic computing device including a camera having an image input configured to capture images in a direction from the portable electronic computing device, the system comprising:
   (I) a first case section including
      (A) at least one interior surface,
      (B) a first side including at least one first wall portion with the at least one first wall portion angularly extending relative to the at least one interior surface,
      (C) a second side including at least one second wall portion with the at least one second wall portion angularly extending relative to the at least one interior surface, and
      (D) a third side including at least one third wall portion with the at least one third wall portion angularly extending relative to the at least one interior surface,
      wherein the at least one first wall portion extends perpendicularly to the second wall portion, and
      wherein the at least one first wall portion extends parallel with the at least one third wall portion such that
      the first case section being configured to receive a first portion of the portable electronic computing device,
      (E) an exterior side,
      (F) a first aperture through the exterior side, the first aperture sized and positioned to align with the image input of the camera of the portable electronic device when the first case section is removably coupled with the first portion of the portable electronic computing device, and
      (G) a second aperture through the exterior side spaced a first distance from the first aperture; and
   (II) a first cover assembly including a plug member and a stem member, the plug member shaped and sized to detachably couple with the first aperture of the first case section, the stem member shaped and sized to detachably couple with the second aperture of the first case section, the plug member and the stem member spaced from one another a second distance to allow for simultaneous coupling of the plug member with the first aperture and the stem member with the second aperture,
   wherein the first cover assembly includes an elongated support member including a side, a tab, a periphery, and a rim surface, the tab extending from the side, the rim surface extending along at least one portion of the periphery of the elongated support member, the plug member extending from the elongated support member,
   wherein the first aperture includes a periphery and a rim surface extending along at least one portion of the periphery of the first aperture; and
   wherein at least one portion of the rim surface of the elongated support member is in contact with at least one portion of the rim surface of the first aperture when the plug member of the first cover assembly is being coupled with the first aperture.

2. The system of claim 1
   wherein the first aperture includes at least one first wall portion,
   wherein the plug member of the first cover assembly includes at least one second wall portion, and
   wherein the at least one first wall portion of the first aperture being adjacent with the at least one second wall portion of the plug member when the plug member is being coupled with the first aperture.

3. The system of claim 1
   wherein the first aperture includes at least one first wall portion and the plug member of the first cover assembly includes at least one second wall portion, and
   wherein the at least one second wall portion of the plug member of the first cover assembly includes at least one rib portion, and
   wherein the at least one first wall portion of the first aperture being adjacent with the at least one rib portion of the second wall portion of the plug member when the plug member is being coupled with the first aperture.

4. The system of claim 1
   wherein at least one portion of the first case section is made of a material selected from a list including rigid plastic, polycarbonate, acrylonitrile butadiene styrene, thermoplastic polymer, polyethylene terephthalate, and nylon, and
   wherein at least one portion of the first cover assembly is made of a material selected from a list including but not limited to silicone, thermoplastic polyurethane, and thermoplastic elastomer.

5. The system of claim 1 wherein the exterior side includes at least one first depressed portion adjacent at least one portion of the first aperture, the at least one first depressed portion sized and shaped to receive an elongated support member of the first cover assembly.

6. The system of claim 1
   wherein the plug member of the first cover assembly includes at least one second wall portion, and
   wherein the at least one second wall portion of the plug member of the first cover assembly includes at least one rib portion.

7. The system of claim 1
   wherein the first cover assembly includes an extended member coupled with the stem member and the plug member,
   wherein the extended member includes a surface portion, wherein the stem member includes a longitudinal dimension being transverse to the surface portion of the extended member, wherein the stem member includes a first portion proximate to the surface portion of the extended member and a second portion distal to the surface portion of the extended member, wherein the first portion of the stem member includes a first dimension transverse to the longitudinal dimension of the stem member, wherein the second portion of the stem member includes a second dimension transverse to the longitudinal dimension of the stem member, and wherein the second dimension of the stem member is greater than the first dimension of the stem member.

8. A system for a portable electronic computing device, the portable electronic computing device including a camera having an image input configured to capture images in a direction from the portable electronic computing device, the system comprising:
(I) a first case section including
(A) at least one interior surface,
(B) a first side including at least one first wall portion with the at least one first wall portion angularly extending relative to the at least one interior surface,
(C) a second side including at least one second wall portion with the at least one second wall portion angularly extending relative to the at least one interior surface, and
(D) a third side including at least one third wall portion with the at least one third wall portion angularly extending relative to the at least one interior surface,
wherein the at least one first wall portion extends perpendicularly to the second wall portion, and
wherein the at least one first wall portion extends parallel with the at least one third wall portion such that
the first case section being configured to receive a first portion of the portable electronic computing device,
(E) an exterior side,
(F) a first aperture through the exterior side, the first aperture sized and positioned to align with the image input of the camera of the portable electronic device when the first case section is removably coupled with the first portion of the portable electronic computing device, and
(G) a second aperture through the exterior side spaced a first distance from the first aperture; and
(II) a first cover assembly including a plug member and a stem member, the plug member shaped and sized to detachably couple with the first aperture of the first case section, the stem member shaped and sized to detachably couple with the second aperture of the first case section, the plug member and the stem member spaced from one another a second distance to allow for simultaneous coupling of the plug member with the first aperture and the stem member with the second aperture,
wherein the first aperture includes at least one first wall portion and at least one projection portion extending from the at least one first wall portion,
wherein the plug member of the first cover assembly includes at least one second wall portion, the at least one second wall portion including at least one notch portion, and
wherein the at least one projection portion of the first aperture being coupled with the at least one notch portion of the plug member of the first cover assembly when the plug member of the first cover assembly is being coupled with the first aperture.

9. The system of claim 8
wherein the exterior side includes at least one first depressed portion adjacent at least one portion of the first aperture,
wherein the first cover assembly includes an elongated support member, the plug member of the first cover assembly extending from the elongated support member, and
wherein at least one portion of the elongated support member is received by the at least one first depressed portion of the exterior side when the plug member of the first cover assembly is being coupled with the first aperture.

10. A system for a portable electronic computing device, the portable electronic computing device including a camera having an image input configured to capture images in a direction from the portable electronic computing device, the system comprising:
(I) a first case section including
(A) at least one interior surface,
(B) a first side including at least one first wall portion with the at least one first wall portion angularly extending relative to the at least one interior surface,
(C) a second side including at least one second wall portion with the at least one second wall portion angularly extending relative to the at least one interior surface, and
(D) a third side including at least one third wall portion with the at least one third wall portion angularly extending relative to the at least one interior surface,
wherein the at least one first wall portion extends perpendicularly to the second wall portion, and
wherein the at least one first wall portion extends parallel with the at least one third wall portion such that
the first case section being configured to receive a first portion of the portable electronic computing device,
(E) an exterior side,
(F) a first aperture through the exterior side, the first aperture sized and positioned to align with the image input of the camera of the portable electronic device when the first case section is removably coupled with the first portion of the portable electronic computing device, and
(G) a second aperture through the exterior side spaced a first distance from the first aperture; and
(II) a first cover assembly including a plug member and a stem member, the plug member shaped and sized to detachably couple with the first aperture of the first case section, the stem member shaped and sized to detachably couple with the second aperture of the first case section, the plug member and the stem member spaced from one another a second distance to allow for simultaneous coupling of the plug member with the first aperture and the stem member with the second aperture,
wherein the second aperture includes a first portion and a second portion, the first portion being proximate to the exterior side of the first case section and the second portion being distal from the exterior side, and
wherein the first portion includes a first volumetric dimension and the second portion includes a second volumetric dimension, the first volumetric dimension being greater than the second volumetric dimension.

11. The system of claim 10
wherein the stem member of the first cover assembly being in contact with the first portion of the second aperture when the stem member is being coupled with the second aperture, and
wherein the stem member of the first cover assembly being free from contact with the second portion of the second aperture when the stem member is being coupled with the second aperture.

12. The system of claim 11
wherein the first cover assembly includes an extended member coupled with the stem member and the plug member,
wherein the extended member includes a surface portion,
wherein the stem member includes a longitudinal dimension being transverse to the surface portion of the extended member,
wherein the stem member includes a first portion proximate to the surface portion of the extended member and a second portion distal to the surface portion of the extended member,
wherein the first portion of the stem member includes a first dimension transverse to the longitudinal dimension of the stem member,
wherein the second portion of the stem member includes a second dimension transverse to the longitudinal dimension of the stem member, and
wherein the second dimension of the stem member is greater than the first dimension of the stem member.

13. The system of claim 12
wherein the second aperture being in contact with the first portion of the stem member when the stem member is being coupled with the second aperture, and
wherein the second aperture being free from contact with the second portion of the stem member when the stem member is being coupled with the second aperture.

14. The system of claim 12
wherein the extended member includes a first longitudinal dimension, the first longitudinal dimension including at least one portion of the second distance spacing between the stem member and the plug member.

15. The system of claim 12
wherein the exterior side includes at least one second depressed portion adjacent at least one portion of the second aperture of the first case section, and
wherein at least one portion of the extended member of the first cover assembly is received by the at least one second depressed portion of the exterior side when the stem member is being coupled with the first aperture.

16. The system of claim 15
wherein the extended member includes at least one first exterior surface,
wherein the at least one first exterior surface of the extended member includes at least one crease running transverse to the first longitudinal dimension of the extended member, and
wherein the at least one crease allows at least in part bending of the extended member along the at least one crease for at least one positioning of the first cover assembly in which the stem member of first cover assembly is coupled with the second aperture of the first case section and the plug member of the first cover assembly is uncoupled from the first aperture of the first case section.

17. A system for a portable electronic computing device, the portable electronic computing device including a camera having an image input configured to capture images in a direction from the portable electronic computing device, the system comprising:
(I) a first case section including
 (A) at least one interior surface,
 (B) a first side including at least one first wall portion with the at least one first wall portion angularly extending relative to the at least one interior surface,
 (C) a second side including at least one second wall portion with the at least one second wall portion angularly extending relative to the at least one interior surface, and
 (D) a third side including at least one third wall portion with the at least one third wall portion angularly extending relative to the at least one interior surface,
 wherein the at least one first wall portion extends perpendicularly to the second wall portion, and
 wherein the at least one first wall portion extends parallel with the at least one third wall portion such that
 the first case section being configured to receive a first portion of the portable electronic computing device,
 (E) an exterior side,
 (F) a first aperture through the exterior side, the first aperture sized and positioned to align with the image input of the camera of the portable electronic device when the first case section is removably coupled with the first portion of the portable electronic computing device, and
 (G) a second aperture through the exterior side spaced a first distance from the first aperture; and
(II) a first cover assembly including a plug member and a stem member, the plug member shaped and sized to detachably couple with the first aperture of the first case section, the stem member shaped and sized to detachably couple with the second aperture of the first case section, the plug member and the stem member spaced from one another a second distance to allow for simultaneous coupling of the plug member with the first aperture and the stem member with the second aperture,
wherein the first aperture includes at least one first wall portion and at least one projection portion extending from the at least one first wall portion, the at least one projection portion configured to engage with a notch portion of the first cover assembly.

* * * * *